US006595892B2

(12) United States Patent
Raghavan et al.

(10) Patent No.: US 6,595,892 B2

(45) Date of Patent: Jul. 22, 2003

(54) MULTI-SPEED TRANSMISSION FAMILY WITH THREE PLANETARY GEAR SETS AND FIVE ROTATING TORQUE TRANSMITTING MECHANISMS

(75) Inventors: Madhusudan Raghavan, West Bloomfield, MI (US); Chi-Kuan Kao, Troy, MI (US); Patrick Benedict Usoro, Troy, MI (US)

(73) Assignee: General Motors Corporation, Detroit, MI (US)

(*) Notice: Subject to any disclaimer, the term of this patent is extended or adjusted under 35 U.S.C. 154(b) by 93 days.

(21) Appl. No.: 09/778,150

(22) Filed: Feb. 7, 2001

(65) Prior Publication Data

US 2002/0107104 A1 Aug. 8, 2002

(51) Int. Cl.[7] ........ F16H 3/66

(52) U.S. Cl. ........ 475/296; 475/269

(58) Field of Search ........ 475/269, 296, 475/331

(56) References Cited

U.S. PATENT DOCUMENTS

| | | | | |
|---|---|---|---|---|
| 4,070,927 A | | 1/1978 | Polak | 74/765 |
| 5,106,352 A | | 4/1992 | Lepelletier | 475/280 |
| 5,226,862 A | * | 7/1993 | Hattori | 475/286 |
| 5,599,251 A | | 2/1997 | Beim et al. | 475/275 |
| 5,755,636 A | * | 5/1998 | Justice et al. | 475/275 |
| 5,772,552 A | * | 6/1998 | Ibaraki et al. | 475/281 |
| 5,935,037 A | * | 8/1999 | Hotta et al. | 475/286 |
| 6,071,208 A | | 6/2000 | Koivunen | 475/275 |
| 6,083,135 A | | 7/2000 | Baldwin et al. | 475/276 |
| 6,425,841 B1 | * | 7/2002 | Haka | 475/275 |

FOREIGN PATENT DOCUMENTS

| | | | |
|---|---|---|---|
| EP | 1033510 A1 | * | 6/2000 |
| EP | 1033510 A1 | | 9/2000 |
| JP | 2000-55151 A | * | 2/2000 |

* cited by examiner

*Primary Examiner*—Ankur Parekh

(74) *Attorney, Agent, or Firm*—Kathryn A. Marra

(57) ABSTRACT

A powertrain incorporates three planetary gear sets and five rotating torque transmitting mechanisms in a compact structure having minimum mechanical content to provide at least six forward speed ratios and a reverse ratio between an input shaft and an output shaft. One of the planetary gear sets has three rotatable members with one member continuously connected with the input shaft, another member continuously connected with the output shaft and a further member that is non-continuously interconnected. Another and a further of the planetary gear sets each has three members with respective first members being continuously interconnected and respective second members being continuously interconnected through first and second continuous interconnections, respectively. The third member of the other planetary gear set is non-continuously connected and the third member of the further planetary gear set is continuously connected with a stationary member such as a transmission housing. The five rotating torque transmitting mechanisms are selectively engaged to provide further interconnections between various members of the planetary gear sets.

8 Claims, 14 Drawing Sheets

|  | RATIOS | 50 | 52 | 54 | 56 | 58 |
|---|---|---|---|---|---|---|
| REVERSE | -2.13 |  | X |  |  | X |
| NEUTRAL | 0 |  |  |  |  | X |
| 1st | 4.2 | X |  |  |  | X |
| 2nd | 2.32 | X | X |  |  |  |
| 3rd | 1.63 | X |  | X |  |  |
| 4th | 1 |  | X | X |  |  |
| 5th | 0.78 |  |  | X | X |  |
| 6th | 0.71 |  | X |  | X |  |

(X=ENGAGED CLUTCH)

RING/SUN TOOTH RATIOS: $\frac{R1}{S1}=1.59$, $\frac{R2}{S2}=2.93$, $\frac{R3}{S3}=2.13$

| Ratio Spread | 5.9 |
|---|---|
| Ratio Steps |  |
| Rev/ 1 | -0.51 |
| 1/2 | 1.82 |
| 2/3 | 1.42 |
| 3/4 | 1.63 |
| 4/5 | 1.27 |
| 5/6 | 1.1 |

|  | RATIOS | 150 | 152 | 154 | 156 | 158 |
|---|---|---|---|---|---|---|
| REVERSE | -1.93 | X |  |  | X |  |
| NEUTRAL | 0 | X |  |  |  |  |
| 1st | 3.76 | X |  |  |  | X |
| 2nd | 2.05 |  |  |  | X | X |
| 3rd | 1.36 |  |  | X |  | X |
| 4th | 1 |  |  | X | X |  |
| 5th | 0.7 |  | X | X |  |  |
| 6th | 0.6 | X |  | X |  |  |

(X=ENGAGED CLUTCH)

RING/SUN TOOTH RATIOS: $\frac{R1}{S1}=2.33$, $\frac{R2}{S2}=1.63$, $\frac{R3}{S3}=1.93$

| Ratio Spread | 6.22 |
|---|---|
| Ratio Steps |  |
| Rev/ 1 | -0.51 |
| 1/2 | 1.83 |
| 2/3 | 1.51 |
| 3/4 | 1.36 |
| 4/5 | 1.43 |
| 5/6 | 1.16 |

| | RATIOS | 250 | 252 | 254 | 256 | 258 |
|---|---|---|---|---|---|---|
| REVERSE | -1.44 | | | | X | X |
| NEUTRAL | 0 | | | | | |
| 1st | 2.7 | X | | X | | |
| 2nd | 1.45 | X | | | X | |
| 3rd | 1 | | X | | X | |
| 4th | 0.71 | X | X | | | |
| 5th | 0.59 | | X | | | X |
| 6th | 0.47 | X | | | | X |

(X=ENGAGED CLUTCH)

RING/SUN TOOTH RATIOS: $\frac{R1}{S1}=1.53$, $\frac{R2}{S2}=1.59$, $\frac{R3}{S3}=2.43$

| Ratio Spread | 5.77 |
|---|---|
| Ratio Steps | |
| Rev/ 1 | -0.53 |
| 1/2 | 1.87 |
| 2/3 | 1.45 |
| 3/4 | 1.41 |
| 4/5 | 1.2 |
| 5/6 | 1.26 |

|  | RATIOS | 350 | 352 | 354 | 356 | 358 |
|---|---|---|---|---|---|---|
| REVERSE | -1.65 |  |  | X | X |  |
| NEUTRAL | 0 |  |  |  |  |  |
| 1st | 2.66 | X |  |  |  | X |
| 2nd | 1.4 |  |  | X |  | X |
| 3rd | 1 |  | X | X |  |  |
| 4th | 0.65 |  | X |  |  | X |
| 5th | 0.54 |  | X |  | X |  |
| 6th | 0.45 |  |  |  | X | X |

(X=ENGAGED CLUTCH)

RING/SUN TOOTH RATIOS: $\frac{R1}{S1}=1.65$, $\frac{R2}{S2}=2.30$, $\frac{R3}{S3}=1.85$

| Ratio Spread | 5.96 |
|---|---|
| Ratio Steps |  |
| Rev/ 1 | -0.62 |
| 1/2 | 1.89 |
| 2/3 | 1.4 |
| 3/4 | 1.54 |
| 4/5 | 1.21 |
| 5/6 | 1.2 |

|  | RATIOS | 450 | 452 | 454 | 456 | 458 |
|---|---|---|---|---|---|---|
| REVERSE | -2.13 |  | X | X |  |  |
| NEUTRAL | 0 |  |  | X |  |  |
| 1st | 3.71 |  |  | X |  | X |
| 2nd | 1.96 |  | X |  |  | X |
| 3rd | 1.31 | X |  |  |  | X |
| 4th | 1 | X | X |  |  |  |
| 5th | 0.7 | X |  |  | X |  |
| 6th | 0.61 | X |  | X |  |  |

(X=ENGAGED CLUTCH)

RING/SUN TOOTH RATIOS: $\frac{R1}{S1}=2.33$, $\frac{R2}{S2}=1.83$, $\frac{R3}{S3}=2.13$

| Ratio Spread | 6.04 |
|---|---|
| Ratio Steps |  |
| Rev/ 1 | -0.57 |
| 1/2 | 1.9 |
| 2/3 | 1.5 |
| 3/4 | 1.31 |
| 4/5 | 1.43 |
| 5/6 | 1.14 |

| | RATIOS | 550 | 552 | 554 | 556 | 558 |
|---|---|---|---|---|---|---|
| REVERSE | -2.33 | | X | | X | |
| NEUTRAL | 0 | | | | X | |
| 1st | 3.81 | | | X | X | |
| 2nd | 2.12 | | X | X | | |
| 3rd | 1.34 | X | | X | | |
| 4th | 1 | X | X | | | |
| 5th | 0.72 | X | | | | X |
| 6th | 0.65 | X | | | X | |

(X=ENGAGED CLUTCH)

RING/SUN TOOTH RATIOS: $\frac{R1}{S1}=2.99$, $\frac{R2}{S2}=1.52$, $\frac{R3}{S3}=2.33$

| Ratio Spread | 5.89 |
|---|---|
| Ratio Steps | |
| Rev/ 1 | -0.61 |
| 1/2 | 1.8 |
| 2/3 | 1.58 |
| 3/4 | 1.34 |
| 4/5 | 1.38 |
| 5/6 | 1.12 |

| | RATIOS | 650 | 652 | 654 | 656 | 658 |
|---|---|---|---|---|---|---|
| REVERSE | -2.4 | | X | | | X |
| NEUTRAL | 0 | | X | | | |
| 1st | 3.16 | | X | | X | |
| 2nd | 1.77 | | | | X | X |
| 3rd | 1 | | | X | X | |
| 4th | 0.76 | | | X | | X |
| 5th | 0.61 | X | | X | | |
| 6th | 0.53 | | X | X | | |

(X=ENGAGED CLUTCH)

RING/SUN TOOTH RATIOS: $\frac{R1}{S1}=1.57$, $\frac{R2}{S2}=1.80$, $\frac{R3}{S3}=2.40$

| Ratio Spread | 6 |
|---|---|
| Ratio Steps | |
| Rev/ 1 | -0.76 |
| 1/2 | 1.78 |
| 2/3 | 1.77 |
| 3/4 | 1.32 |
| 4/5 | 1.24 |
| 5/6 | 1.16 |

| | RATIOS | 750 | 752 | 754 | 756 | 758 |
|---|---|---|---|---|---|---|
| REVERSE | -1.98 | X | X | | | |
| NEUTRAL | 0 | X | | | | |
| 1st | 3.95 | X | | | | X |
| 2nd | 2.79 | X | | X | | |
| 3rd | 1.6 | | | X | | X |
| 4th | 1.23 | | | X | X | |
| 5th | 1 | | X | X | | |
| 6th | 0.73 | | X | | | X |

(X=ENGAGED CLUTCH)

RING/SUN TOOTH RATIOS: $\frac{R1}{S1}=1.98$, $\frac{R2}{S2}=1.53$, $\frac{R3}{S3}=1.67$

| Ratio Spread | 5.41 |
|---|---|
| Ratio Steps | |
| Rev/ 1 | -0.5 |
| 1/2 | 1.42 |
| 2/3 | 1.74 |
| 3/4 | 1.3 |
| 4/5 | 1.23 |
| 5/6 | 1.37 |

| | RATIOS | 850 | 852 | 854 | 856 | 858 |
|---|---|---|---|---|---|---|
| REVERSE | -2.47 | X | | X | | |
| NEUTRAL | 0 | X | | | | |
| 1st | 3.73 | X | | | | X |
| 2nd | 2.65 | X | X | | | |
| 3rd | 1.48 | | X | | | X |
| 4th | 1 | | X | X | | |
| 5th | 0.77 | | | X | | X |
| 6th | 0.56 | | | | X | X |

(X=ENGAGED CLUTCH)

RING/SUN TOOTH RATIOS: $\frac{R1}{S1}=2.47$, $\frac{R2}{S2}=1.53$, $\frac{R3}{S3}=2.10$

| Ratio Spread | 6.62 |
|---|---|
| Ratio Steps | |
| Rev/ 1 | -0.66 |
| 1/2 | 1.41 |
| 2/3 | 1.8 |
| 3/4 | 1.48 |
| 4/5 | 1.3 |
| 5/6 | 1.37 |

| | RATIOS | 950 | 952 | 954 | 956 | 958 |
|---|---|---|---|---|---|---|
| REVERSE | -2.86 | | | X | | X |
| NEUTRAL | 0 | | | | | X |
| 1st | 3.62 | X | | | | X |
| 2nd | 2.53 | | | | | X |
| 3rd | 1.65 | X | | | X | |
| 4th | 1 | | | X | X | |
| 5th | 0.69 | | X | X | | |
| 6th | 0.58 | X | | X | | |

(X=ENGAGED CLUTCH)

RING/SUN TOOTH RATIOS: $\frac{R1}{S1}=2.37$, $\frac{R2}{S2}=3.06$, $\frac{R3}{S3}=1.53$

| Ratio Spread | 6.26 |
|---|---|
| Ratio Steps | |
| Rev/ 1 | -0.79 |
| 1/2 | 1.43 |
| 2/3 | 1.54 |
| 3/4 | 1.65 |
| 4/5 | 1.44 |
| 5/6 | 1.2 |

| | RATIOS | 1050 | 1052 | 1054 | 1056 | 1058 |
|---|---|---|---|---|---|---|
| REVERSE | -1.53 | X | | X | | |
| NEUTRAL | 0 | X | | | | |
| 1st | 2.76 | X | | | | X |
| 2nd | 1.47 | | | X | | X |
| 3rd | 1 | | | | X | X |
| 4th | 0.76 | | | X | X | |
| 5th | 0.59 | | X | | X | |
| 6th | 0.46 | X | | | X | |

(X=ENGAGED CLUTCH)

RING/SUN TOOTH RATIOS: $\frac{R1}{S1}=2.33$, $\frac{R2}{S2}=2.73$, $\frac{R3}{S3}=2.53$

| Ratio Spread | 5.95 |
|---|---|
| Ratio Steps | |
| Rev/ 1 | -0.55 |
| 1/2 | 1.88 |
| 2/3 | 1.47 |
| 3/4 | 1.31 |
| 4/5 | 1.3 |
| 5/6 | 1.27 |

| | RATIOS | 1150 | 1152 | 1154 | 1156 | 1158 |
|---|---|---|---|---|---|---|
| REVERSE | -1.67 | X | | | | X |
| NEUTRAL | 0 | | | | | X |
| 1st | 3.25 | | X | | | X |
| 2nd | 1.89 | X | X | | | |
| 3rd | 1 | | X | X | | |
| 4th | 0.65 | X | | X | | |
| 5th | 0.54 | | | X | X | |
| 6th | 0.43 | | | X | | X |
| 7th | 0.26 | X | | | X | |

(X=ENGAGED CLUTCH)

RING/SUN TOOTH RATIOS: $\frac{R1}{S1}=2.99$, $\frac{R2}{S2}=1.52$, $\frac{R3}{S3}=1.67$

| Ratio Spread | (1/6)7.64 | (1/7)12.5 |
|---|---|---|
| Ratio Steps | | |
| Rev/ 1 | -0.51 | -0.51 |
| 1/2 | 1.72 | 1.72 |
| 2/3 | 1.89 | 1.89 |
| 3/4 | 1.54 | 1.54 |
| 4/5 | 1.2 | 1.2 |
| 5/6 | 1.27 | 1.27 |
| 6/7 | - | 1.61 |

|  | RATIOS | 1250 | 1252 | 1254 | 1256 | 1258 |
|---|---|---|---|---|---|---|
| REVERSE | -1.6 |  |  |  | X | X |
| NEUTRAL | 0 |  |  |  | X |  |
| 1st | 2.63 |  | X |  | X |  |
| 2nd | 1.73 | X |  |  | X |  |
| 3rd | 1 |  |  | X | X |  |
| 4th | 0.66 |  | X | X |  |  |
| 5th | 0.55 | X |  | X |  |  |
| 6th | 0.43 |  |  | X |  | X |
| 7th | 0.32 | X |  |  |  | X |

(X=ENGAGED CLUTCH)

RING/SUN TOOTH RATIOS: $\frac{R1}{S1}$ 1.63, $\frac{R2}{S2}$ =2.59, $\frac{R3}{S3}$ =1.81

| Ratio Spread | (1/6)6.11 | (1/7)8.29 |
|---|---|---|
| Ratio Steps |  |  |
| Rev/ 1 | -0.61 | -0.61 |
| 1/2 | 1.52 | 1.52 |
| 2/3 | 1.73 | 1.73 |
| 3/4 | 1.5 | 1.5 |
| 4/5 | 1.21 | 1.21 |
| 5/6 | 1.28 | 1.28 |
| 6/7 | - | 1.34 |

| | RATIOS | 1350 | 1352 | 1354 | 1356 | 1358 |
|---|---|---|---|---|---|---|
| REVERSE | -2.42 | X | | X | | |
| NEUTRAL | 0 | | | | | |
| 1st | 3.13 | | X | | | X |
| 2nd | 2.23 | X | | | | X |
| 3rd | 1.54 | | | X | | X |
| 4th | 1 | | | | X | X |
| 5th | 0.67 | | | X | X | |
| 6th | 0.52 | | X | | X | |
| 7th | 0.42 | X | | | X | |

(X=ENGAGED CLUTCH)

RING/SUN TOOTH RATIOS: $\frac{R1}{S1}$ 1.97, $\frac{R2}{S2}$=2.93, $\frac{R3}{S3}$ =1.73

| Ratio Spread | (1/6)6.06 | (1/7)7.43 |
|---|---|---|
| Ratio Steps | | |
| Rev/ 1 | -0.77 | -0.77 |
| 1/2 | 1.4 | 1.4 |
| 2/3 | 1.45 | 1.45 |
| 3/4 | 1.54 | 1.54 |
| 4/5 | 1.48 | 1.48 |
| 5/6 | 1.3 | 1.3 |
| 6/7 | - | 1.6 |

MULTI-SPEED TRANSMISSION FAMILY WITH THREE PLANETARY GEAR SETS AND FIVE ROTATING TORQUE TRANSMITTING MECHANISMS

TECHNICAL FIELD

This invention relates to multi-speed planetary transmissions for use in vehicles and, more particularly, to multi-speed planetary transmissions having six or more forward speed ratios.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually-shifted (countershaft) transmissions were the most popular.

With the advent of three- and four-speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six-speed transmissions are disclosed in U.S. Pat. No. 4,070,927 issued to Polak on Jan. 31, 1978, U.S. Pat. No. 6,071,208 issued to Koivunen on Jun. 6, 2000, and U.S. Pat. No. 5,106,352 issued to Lepelletier on Apr. 21, 1992.

Six-speed transmissions offer several advantages over four- and five-speed transmissions, including improved vehicle acceleration and improved fuel economy. While many trucks employ power transmissions, such as Polak, having six or more forward gear ratios, passenger cars are still manufactured with three- and four-speed automatic transmissions and relatively few five- or six-speed devices due to the size and complexity of these transmissions. The Polak transmission provides six forward speed ratios with three planetary gear sets, two clutches and three brakes. The Koivunen patent utilizes six torque transmitting devices including four brakes and two clutches to establish the six forward speed ratios and another reverse ratio. The Lepelletier employs three planetary gear sets, three clutches and two brakes to provide six forward speeds. One of the planetary gear sets is positioned and operated to establish two fixed speed input members for the remaining planetary gear sets.

SUMMARY OF THE INVENTION

It is an object of the present invention to provide an improved family of multi-speed transmissions each having three planetary gear sets and five selectively engageable torque transmitting mechanisms.

In another aspect of the present invention, one of the planetary gear sets has a member continuously connected with an input shaft, another member continuously connected with an output shaft, and a further member non-continuously connected. In another aspect of the present invention, two of the planetary gear sets have two members thereof continuously interconnected. In yet another aspect of the present invention, one of the planetary gear set having two interconnected members has a third member continuously connected with a stationary member such as the transmission housing and the other of the planetary gear sets has a non-continuously connected member.

In still another aspect of the present invention, the five torque transmitting mechanisms are all selectively engageable rotating torque transmitting mechanisms (clutches). In a further aspect of the present invention, the clutches are selectively engaged in combinations of two to provide at least six forward speed ratios and a reverse ratio.

The present invention defines a family of transmission wherein each family incorporates three planetary gear sets and five rotating torque transmitting mechanisms to establish a compact structure having minimum mechanical content to provide six forward speed ratios and a reverse ratio between an engine driven input shaft and an output shaft. Another of the planetary gear sets has three rotatable members with another member continuously connected with the input shaft, another member continuously connected with the output shaft and a further member that is non-continuously interconnected. Another and a further of the planetary gear sets each has three members with respective first members being continuously interconnected and respective second members being continuously interconnected through first and second continuous interconnections, respectively. The third member of the other planetary gear set is non-continuously connected and the third member of the further planetary gear set is continuously connected with a stationary member such as a transmission housing.

The five rotating torque transmitting mechanisms are rotating-type mechanisms that are selectively engaged to provide further interconnections between members of the planetary gear arrangement. A first of the torque transmitting mechanisms selectively interconnects one of the continuous interconnections with either the input shaft, the output shaft, or the non-continuously connected member of one of the planetary gear sets. A second of the torque transmitting mechanisms selectively interconnects one of the continuous interconnections with either the input shaft, the output shaft, or a non-continuously connected member of one of the planetary gear sets. A third of the torque transmitting mechanisms selectively interconnects one of the continuous interconnections with either the input shaft, the output shaft, or the non-continuously connected member of one of the planetary gear sets. A fourth of the torque transmitting mechanisms selectively interconnects the first continuous interconnection, the second continuous interconnection, or the non-continuously connected member of one of the planetary gear sets with either the input shaft or the output shaft. A fifth of the torque transmitting mechanisms selectively interconnects one of the non-continuously connected members or one of the continuous interconnection with either the input shaft, the output shaft, or the other of the non-continuously connected members.

The planetary gear sets include a sun gear member, a ring gear member, and a planet carrier assembly member. Each of these can be defined as the first, second or third member in a specific family member. The planet carrier assembly member can have a plurality of pinion gears meshing with both the sun gear member and the ring gear member (simple planetary) or a plurality of intermeshing pinion gears meshing with the sun gear member and the ring gear member, respectively (compound planetary). Each family member has at least one simple planetary gear set while the other two planetary gear sets may be either of the simple or compound type of planetary gear set.

DESCRIPTION OF AN EXEMPLARY EMBODIMENT

Figures 1, 2:
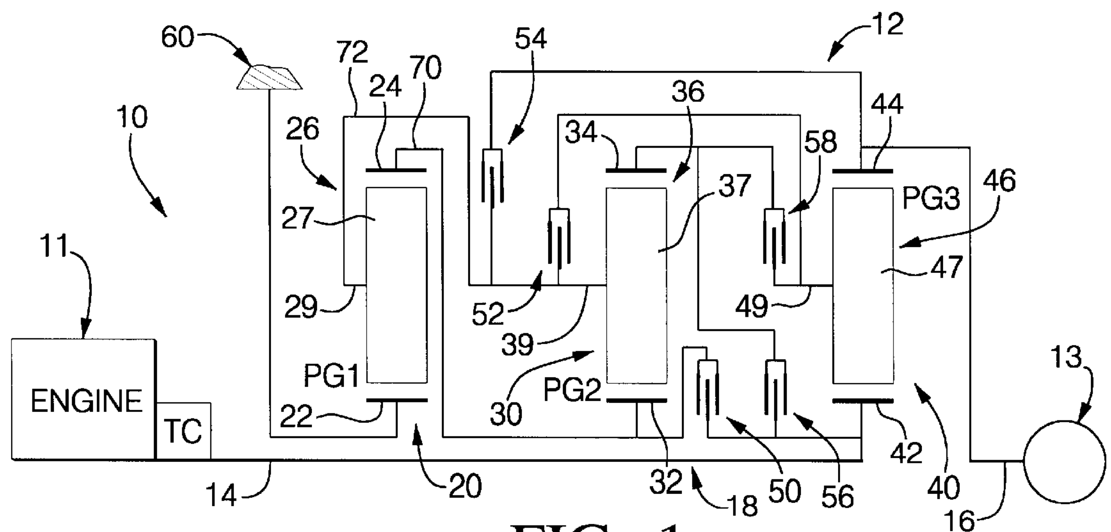
FIG. 1 is schematic representation of a powertrain incorporating one embodiment of the present invention.
FIG. 2 is a truth table and chart describing some of the operating characteristics of the powertrain depicted in FIG. 1.

A powertrain 10, shown in FIG. 1, includes a conventional engine 11, a multi-speed planetary transmission 12, and a conventional final drive 13. The multi-speed planetary transmission incorporates an input shaft 14, an output shaft 16 and a planetary gearing arrangement 18. The planetary gearing arrangement 18 has a first planetary gear set 20, a second planetary gear set 30 and a third planetary gear set 40. The planetary gearing arrangement 18 also consists of five torque transmitting mechanisms 50, 52, 54, 56 and 58. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors, to name a couple.

The planetary gear set 20 includes a sun gear member 22, a ring gear member 24 and a planet carrier assembly member 26 that has a plurality of pinion gear members 27 rotatably mounted on a carrier member 29 and disposed in meshing relation with both the sun gear member 22 and the ring gear member 24. The planetary gear set 30 has a sun gear member 32, a ring gear member 34 and a planet carrier assembly member 36 that includes a plurality of pinion gear members 37 rotatably mounted on a carrier member 39 and disposed in meshing relation with both the sun gear member 32 and the ring gear member 34. The planetary gear set 40 includes a sun gear member 42, a ring gear member 44 and a planet carrier assembly member 46 that has a plurality of pinion gear members 47 rotatably mounted on a carrier member 49 and disposed in meshing relation with both the sun gear member 42 and the ring gear member 44.

The sun gear member 22 is continuously connected with a grounding member such as the transmission housing 60. The ring gear member 24 is continuously interconnected with the sun gear member 32 through a first continuous interconnection or interconnecting member 70 and the planet carrier assembly member 26 is continuously interconnected to the planet carrier assembly member 36 through a second continuous interconnection or interconnecting member 72. The second continuous interconnection 72 is selectively connected with the ring gear member 44 and the output shaft 16 through the torque transmitting mechanism 54 and with the planet carrier assembly member 46 through the torque transmitting mechanism 52. The first continuous interconnection 70 is selectively connectable with the input shaft 14 and the sun gear member 42 through the torque transmitting mechanism 50. The sun gear member 42 is continuously connected with the input shaft 14 and selectively connectable with the ring gear member 34 through the torque transmitting mechanism 56. The ring gear member 34 is selectively connectable with the planet carrier assembly member 46 through the torque transmitting mechanism 58. The planetary gear set 20 has each member continuously connected with respective members of the planetary gear set 30 and the grounding member. The planetary gear set 30 has one member that is non-continuously connected. The planetary gear set 40 has two members continuously connected with the input shaft 14 and the output shaft 16, respectively, and one member that is non-continuously connected.

As shown in FIG. 2, the torque transmitting mechanisms 50, 52, 54, 56 and 58 are selectively engaged in combinations of two to establish six forward speed ratios and a reverse speed ratio between the input shaft 14 and the output shaft 16. A neutral condition is also available in the planetary gear arrangement 18 during which the torque transmitting mechanism 58 may be engaged. To establish the reverse speed ratio, the torque transmitting mechanisms 52 and 58 are engaged, thereby connecting the planet carrier assembly member 46 with the ring gear member 34 and the second continuous interconnection 72. This effectively grounds the planetary gear sets 20 and 30 and the planet carrier assembly member 46. The numerical value of the reverse ratio is determined by the tooth ratios of the planetary gear set 40.

The first forward speed ratio is established by the engagement of the torque transmitting mechanisms 50 and 58, thereby selectively interconnecting the planet carrier assembly member 46 and ring gear member 34 interconnecting the input shaft 14 and the first continuous interconnection. Each of the planetary gear sets 20, 30 and 40 have one member connected with the input shaft. The sun gear member 22 is a reaction member. The planet carrier assembly member 26 is rotated at a speed determined by the tooth ratio of the planetary gear set 20. The ring gear member 34 and the planet carrier assembly member 46 are rotated at a speed determined by the speed of the planet carrier assembly member 36 and the tooth ratio of the planetary gear set 30. The ring gear member 44 and the output shaft 16 are rotated forwardly at a reduced speed that is influenced by the speed of the sun gear member 42 and the planet carrier assembly member 46. The numeric value of the first forward ratio is determined by the tooth ratios of the planetary gear sets 20, 30 and 40.

The second forward speed ratio is established by the engagement of the torque transmitting mechanisms 50 and 52, thereby selectively interconnecting the first continuous interconnection 70 with the input shaft 14 and the second continuous interconnection 72 with the planet carrier assembly member 46. The planet carrier assembly member 26 and the planet carrier assembly member 46 are rotated forwardly at a speed determined by the speed of the ring gear member 24 (input speed) and the tooth ratio of the planetary gear set 20. The ring gear member 44 and the output shaft 16 are rotated forwardly at a speed determined by the speed of the sun gear member 42 (input speed), the speed of the planet carrier assembly member 46 and the tooth ratio of the planetary gear set 40. The numeric value of the second forward speed ratio is determined by the tooth ratios of the planetary gear sets 20 and 40.

The third forward speed ratio is established by the engagement of the torque transmitting mechanisms 50 and 54, thereby selectively interconnecting the input shaft with the first continuous interconnection 70 and the second continuous interconnection 27 with the output shaft 16. The planet carrier assembly member 26 and the output shaft 16 are rotated forwardly at a speed determined by the speed of the ring gear member 24 and the tooth ratio of the planetary gear set 20. The numeric value of the third forward ratio is determined by the tooth ratio of the planetary gear set 20.

The fourth forward speed ratio is established by the engagement of the torque transmitting mechanisms 52 and 54, thereby selectively interconnecting the second continuous interconnection 72 with the planet carrier assembly member 46 and the second continuous interconnection 72 with the output shaft 16. The planetary gear set 40 thus has the planet carrier assembly member 46 and the ring gear member 44 interconnected resulting in a one to one or direct drive ratio. The numerical ratio of the fourth forward speed ratio is unity.

The fifth forward speed ratio is established by the engagement of the torque transmitting mechanisms 54 and 56, thereby selectively interconnecting the second continuous interconnection 72 and the output shaft 16 and selectively interconnecting the input shaft 14 and the ring gear member 34. The sun gear member 32 and the ring gear member 24 are rotating reaction members resulting in an increased forward speed of the planet carrier assembly member 26 and the output shaft 16. The numeric value of the fifth forward speed ratio is determined by the tooth ratios of the planetary gear sets 20 and 30.

The sixth forward speed ratio is established by the engagement of the torque transmitting mechanisms 52 and 56, thereby selectively interconnecting the second continuous interconnection 72 with the planet carrier assembly member 46 and the input shaft 14 with the ring gear member 34. The sun gear member 32 and the ring gear member 24 are rotating reaction members resulting in an increased forward speed of the planet carrier assembly members 26, 36 and 46 which are interconnected. The forward increased speed of the planet carrier assembly member 46 results in an increased forward speed of the output shaft 16. The numeric value of the sixth forward speed ratio is determined by the tooth ratios of the planetary gear sets 20, 30 and 40.

As can be determined from the truth table of FIG. 2, all of the single step ratio interchanges (first/second, second/third, etc.) in the forward direction are single transition interchanges. It is also obvious from the truth table that all of the double step interchanges (first/third, second/fourth, etc.) are of the single transition type. The truth table also describes the torque transmitting mechanisms necessary to complete each of the ratios and an example of the numeric values for each ratio when the given ring/sun tooth ratios are employed. FIG. 2 also provides an example of the ratio steps and the overall ratio spread when the given ratios are used.

Figures 3, 4:
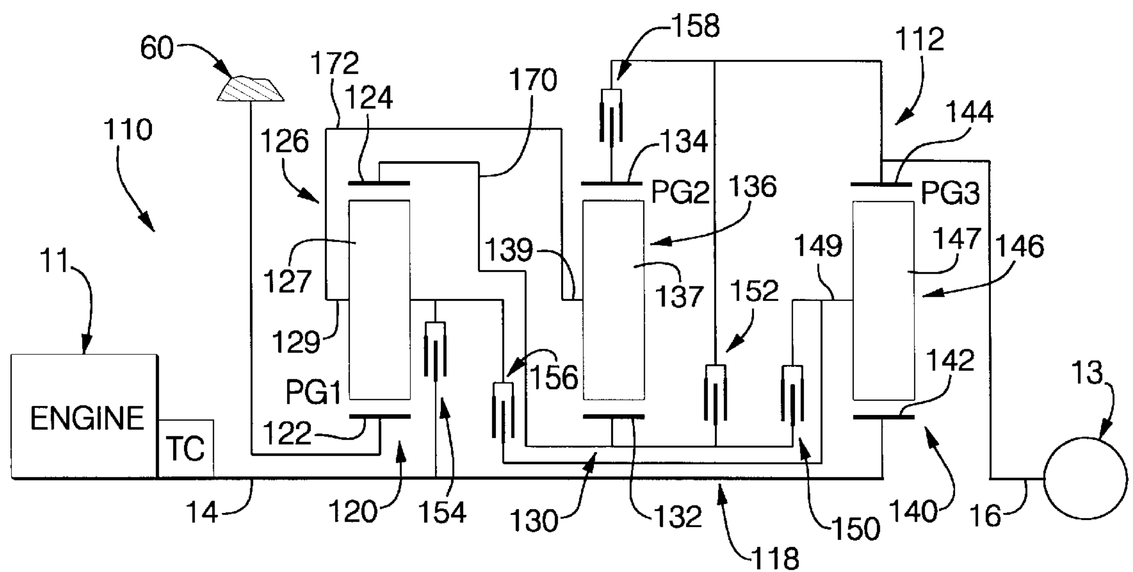
FIG. 3 is schematic representation of a powertrain incorporating another embodiment of the present invention.
FIG. 4 is a truth table and chart describing some of the operating characteristics of the powertrain depicted in FIG. 3.

A powertrain 110, shown in FIG. 3, includes a conventional engine 11, a multi-speed planetary transmission 112, and a conventional final drive 13. The multi-speed planetary transmission incorporates an input shaft 14, an output shaft 16 and a planetary gearing arrangement 118. The planetary gearing arrangement 118 has a first planetary gear set 120, a second planetary gear set 130 and a third planetary gear set 140. The planetary gearing arrangement 118 also includes five torque transmitting mechanisms 150, 152, 154, 156 and 158. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 120 includes a sun gear member 122, a ring gear member 124 and a planet carrier assembly member 126 that has a plurality of pinion gear members 127 rotatably mounted on a carrier member 129 and disposed in meshing relation with both the sun gear member 122 and the ring gear member 124. The planetary gear set 130 has a sun gear member 132, a ring gear member 134 and a planet carrier assembly member 136 that includes a plurality of pinion gear members 137 rotatably mounted on a carrier member 139 and disposed in meshing relation with both the sun gear member 132 and the ring gear member 134. The planetary gear set 140 includes a sun gear member 142, a ring gear member 144 and a planet carrier assembly member 146 that has a plurality of pinion gear members 147 rotatably mounted on a carrier member 149 and disposed in meshing relation with both the sun gear member 142 and the ring gear member 144.

The sun gear member 122 is continuously connected with a grounding member such as the transmission housing 60. The ring gear member 124 is continuously interconnected with the sun gear member 132 through a first continuous interconnection 170 and the planet carrier assembly member 126 is continuously interconnected to the planet carrier assembly member 136 through a second continuous interconnection 172. The second continuous interconnection 172 is selectively with the sun gear member 142 and the input shaft 14 through the torque transmitting mechanism 154 and with the planet carrier assembly member 146 through the torque transmitting mechanism 156. The first continuous interconnection 170 is selectively connectable with the ring gear member 144 and the output shaft 16 through the torque transmitting mechanism 152 and the planet carrier assembly member 146 through the torque transmitting mechanism 150. The sun gear member 142 is continuously connected with the input shaft 14. The ring gear member 134 is selectively connectable with the ring gear member 144 and the output shaft 16 through the torque transmitting mechanism 158. The planetary gear set 120 has each member continuously connected with respective members of the planetary gear set 130 and the grounding member 60. The planetary gear set 130 has one member that is non-continuously connected. The planetary gear set 140 has two members continuously connected with the input shaft 14 and the output shaft 16, respectively, and one member that is non-continuously connected.

As shown in FIG. 4, the torque transmitting mechanisms 150, 152, 154, 156 and 158 are selectively engaged in combinations of two to establish six forward speed ratios and a reverse speed ratio between the input shaft 14 and the output shaft 16. A neutral condition is also available in the planetary gear arrangement 118 during which the torque transmitting mechanism 150 may be engaged. To establish the reverse speed ratio, the torque transmitting mechanisms 150 and 156 are engaged, thereby connecting the planet carrier assembly member 146 with the first continuous interconnection 170 second continuous interconnection 172. This effectively grounds the planetary gear sets 120 and 130 and the planet carrier assembly member 146. The numerical value of the reverse ratio is determined by the tooth ratios of the planetary gear set 140.

The first forward speed ratio is established by the engagement of the torque transmitting mechanism 150 and 158. The planet carrier assembly member 146 is connected with the first continuous interconnection 170 and the ring gear member 134 is connected with the ring gear member 144 and the output shaft 16. This causes forward rotation of the planet carrier assembly member 146, the sun gear member 132 and the ring gear member 124. The planet carrier assembly member 126 and the planet carrier assembly member 136 are rotated forwardly at a speed determined by the speed of the ring gear member 124 and the tooth ratio of the planetary gear set 120. The ring gear member 134, ring gear member 144, and the output shaft are rotated forwardly at a reduced speed determined by the speed of the sun gear member 132, the planet carrier assembly member 136 and the tooth ratio of the planetary gear set 130. The numeric value of the first forward speed ratio is determined by the tooth ratios of the planetary gear sets 120, 130 and 140.

The second forward speed ratio is established by the engagement of the torque transmitting mechanisms 156 and 158. This connects the planet carrier assembly member 146 with the second continuous interconnection 172 and the ring gear member 134 with the ring gear member 144 and the output shaft 16. The planet carrier assembly members 146, 136 and 126 are rotated forwardly at a speed determined by the tooth ratio of the planetary gear set 140. The ring gear member 124 and the sun gear member 132 are rotated forwardly at a speed determined by the speed of the planet carrier assembly member 126 and the tooth ratio of the planetary gear set 120. The ring gear members 134 and 144 and the output shaft 16 are rotated forwardly at a reduced speed determined by the speed of the planet carrier assembly member 134, the speed of the sun gear member 132, and the tooth ratio of the planetary gear set 130. The numeric value of the second forward speed is determined by the tooth ratios of the planetary gear sets 120, 130 and 140.

The third forward speed ratio is established by the engagement of the torque transmitting mechanisms 154 and 158. This connects the input shaft with the second continuous interconnection 172 and the ring gear member 134 with the ring gear member 144 and the output shaft 16. The planet carrier assembly members 126 and 136 are rotated at the speed of the input shaft 14 and the ring gear member 124 and the sun gear member 132 are overdriven forwardly at a speed determined by the speed of the planet carrier assembly member 126 and the tooth ratio of the planetary gear set 120. The ring gear member 134 and the output shaft 16 are driven forwardly at a reduce speed determined by the speed of the planet carrier assembly member 136, the speed of the sun gear member 132, and the tooth ratio of the planetary gear set 130. The overall numeric value of the third forward speed ratio is determined by the planetary gear sets 120 and 130.

The fourth forward speed ratio is established by the engagement of the torque transmitting mechanisms 154 and 156. This connects the planet carrier assembly member 144 with the input shaft 14 such that the sun gear member 142 and the planet carrier assembly member 146 are both rotated at the speed of the input shaft 14. Therefore, the ring gear member 144 is also rotated at the speed of the input shaft 14. The fourth forward speed ratio is a one-to-one ratio or direct drive.

The fifth forward speed ratio is established by the engagement of the torque transmitting mechanisms 152 and 154. This connects the input shaft 14 with the second continuous interconnection 172 and the first continuous interconnection 170 with the output shaft 16. The ring gear member 124, the ring gear member 144 and the output shaft 16 are driven forwardly at an increased speed determined by the speed of the planet carrier assembly member 126 and the tooth ratio of the planetary gear set 120. The numeric value of the fifth forward speed ratio is determined by the tooth ratio of the planetary gear set 120.

The sixth forward speed ratio is established by the engagement of the torque transmitting mechanisms 150 and 154. This connects the second continuous interconnection 172 with the input shaft 14 and the planet carrier assembly member 146 with the second continuous interconnection 172. The ring gear member 24 and planet carrier assembly member 146 are driven forwardly at an increased speed determined by the speed of the planet carrier assembly member 126 and the tooth ratio of the planetary gear set 120. The ring gear member 144 and the output shaft 16 are driven forwardly at an increased speed determined by the speed of the sun gear member 142, the speed of the planet carrier assembly member 146 and the tooth ratio of the planetary gear set 140. The numeric value of the sixth forward speed ratio is determined by the tooth ratios of the planetary gear sets 120 and 140.

As can be determined from the truth table of FIG. 4, all of the single step ratio interchanges (first/second, second/third, etc.) in the forward direction are single transition interchanges. It is also obvious from the truth table that all of the double step interchanges (first/third, second/fourth, etc.) are of the single transition type. The truth table also describes the torque transmitting mechanisms necessary to complete each of the ratios and an example of the numeric values for each ratio when the given ring/sun tooth ratios are employed. FIG. 4 also provides an example of the ratio steps and the overall ratio spread when the given ratios are used.

Figures 5, 6:
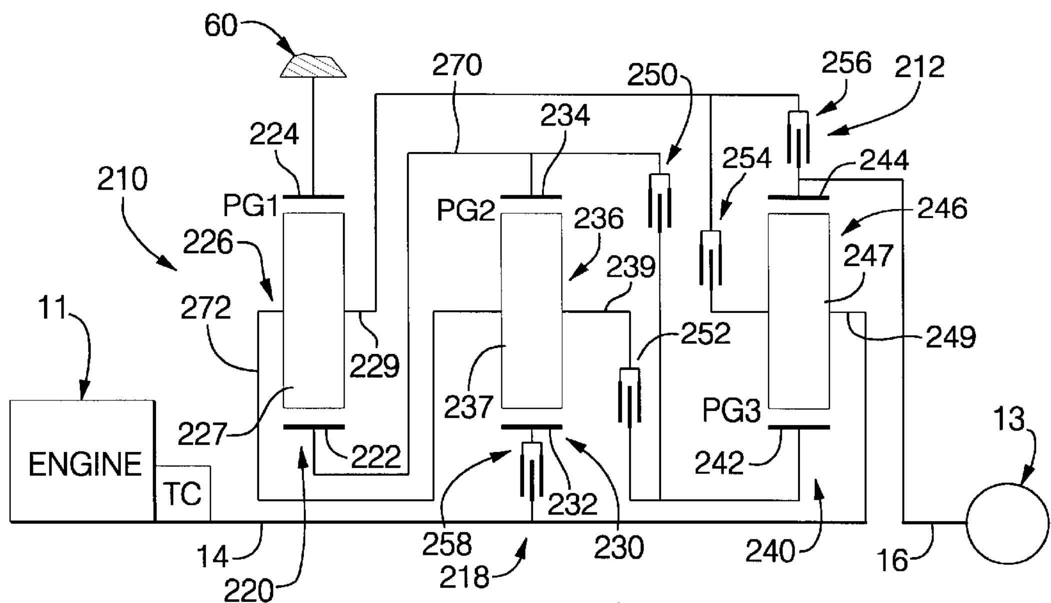
FIG. 5 is schematic representation of a powertrain incorporating another embodiment of the present invention.
FIG. 6 is a truth table and chart describing some of the operating characteristics of the powertrain depicted in FIG. 5.

A powertrain 210, shown in FIG. 5, includes a conventional engine 11, a multi-speed planetary transmission 212, and a conventional final drive 13. The multi-speed planetary transmission incorporates an input shaft 14, an output shaft 16 and a planetary gearing arrangement 218. The planetary gearing arrangement 218 has a first planetary gear set 220, a second planetary gear set 230 and a third planetary gear set 240. The planetary gearing arrangement 218 also includes five torque transmitting mechanisms 250, 252, 254, 256 and 258. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 220 includes a sun gear member 222, a ring gear member 224 and a planet carrier assembly member 226 that has a plurality of pinion gear members 227 rotatably mounted on a carrier member 229 and disposed in meshing relation with both the sun gear member 222 and the ring gear member 224. The planetary gear set 230 has a sun gear member 232, a ring gear member 234 and a planet carrier assembly member 236 that includes a plurality of pinion gear members 237 rotatably mounted on a carrier member 239 and disposed in meshing relation with both the sun gear member 232 and the ring gear member 234. The planetary gear set 240 includes a sun gear member 242, a ring gear member 244 and a planet carrier assembly member 246 that has a plurality of pinion gear members 247 rotatably mounted on a carrier member 249 and disposed in meshing relation with both the sun gear member 242 and the ring gear member 244.

The ring gear member 224 is continuously connected with a grounding member such as the transmission housing 60. The sun gear member 222 is continuously interconnected with the ring gear member 234 through a first continuous interconnection 270 and the planet carrier assembly member 226 is continuously interconnected to the planet carrier assembly member 236 through a second continuous interconnection 272. The second continuous interconnection 272 is selectively connectable with the sun gear member 242 through the torque transmitting mechanism 252 and with the ring gear member 244 and the output shaft 16 through the torque transmitting mechanism 256, and with the input shaft 14 and planet carrier assembly member 246 through the torque transmitting mechanism 254. The first continuous interconnection 270 is selectively connectable with the sun gear member 242 through the torque transmitting mechanism 250. The planet carrier assembly member 246 is continuously connected with the input shaft 14. The sun gear member 230 is selectively connectable with the planet carrier assembly member 246 and the input shaft 14 thorough the torque transmitting mechanism 258. The planetary gear set 220 has each member continuously connected with respective members of the planetary gear set 230 and the grounding member 60. The planetary gear set 230 has one member that is non-continuously connected. The planetary gear set 240 has two members continuously connected with the input shaft 14 and the output shaft 16, respectively, and one member that is non-continuously connected.

As shown in FIG. 6, the torque transmitting mechanisms 250, 252, 254, 256 and 258 are engaged in combinations of two to establish six forward speed ratios and a reverse speed ratio between the input shaft 14 and the output shaft 16. A neutral condition during which all of the torque transmitting mechanisms are released is also available. To establish the reverse speed ratio, the torque transmitting mechanisms 256 and 258 are engaged. This connects the input shaft 14 with the sun gear member 232 and the second continuous interconnection 272 with the output shaft 16. The forward rotation of the sun gear member 232 results in reverse rotation of the ring gear member 234 and the sun gear member 222 at a speed determined by the speed of the sun gear member 232 and the tooth ratio of the planetary gear set 230. The planet carrier assembly members 226 and 236 and the ring gear member 244 and the output shaft 16 are driven in the reverse direction at a speed determined by the speed of the sun gear member 222 and the tooth ratio of the planetary gear set 220. The numeric value of the reverse ratio is determined by the tooth ratios of the planetary gear sets 220 and 230.

The first forward speed ratio is established by the engagement of the torque transmitting mechanisms 250 and 254. This connects the sun gear member 242 with the first continuous interconnection 270 and the planet carrier assembly member 246 and the input shaft 14 with the second continuous interconnection 272. The planet carrier assembly member 226 is rotated forwardly at input speed resulting in forward rotation of the sun gear member 222, ring gear member 234 and sun gear member 242 at an increased forward speed determined by the tooth ratio of the planetary gear set 220. The ring gear member 246 and the output shaft 16 are driven forwardly at a reduced speed determined by the speed of the planet carrier assembly member 246, the speed of the sun gear member 242 and the tooth ratio of the planetary gear set 240. The numeric value of the first forward speed ratio is determined by the tooth ratios of the planetary gear sets 220 and 240.

The second forward speed ratio is established by the engagement of the torque transmitting mechanisms 250 and 256. This connects the sun gear member 242 with the first continuous interconnection 270 and the second continuous interconnection 272 with the ring gear member 244 and the output shaft 16. The sun gear member 242 and the sun gear member 222 rotate forwardly at a speed determined by the tooth ratio of the planetary gear set 240. The planet carrier assembly member 226, the ring gear member 244 and the output shaft 16 rotate forwardly at a speed determined by the speed of the sun gear member 222 and the tooth ratio of the planetary gear set 220. The numeric value of the second forward speed ratio is determined by the tooth ratios of the planetary gear sets 220 and 240.

The third forward speed ratio is established by the engagement of the torque transmitting mechanisms 252 and 256. This combination connects the sun gear member 242 with the ring gear member 246 which places the planetary gear set 240 in a direct drive or one to one ratio. Thus, the third forward speed ratio is a one-to-one ratio.

The fourth forward speed ratio is established by the engagement of the torque transmitting mechanisms 250 and 252. This connects the sun gear member 242 with both the first continuous interconnection 270 and the second continuous interconnection 272. This effectively connects the sun gear member 242 with the grounding member 60. The speed of the ring gear member 244 and the output shaft 16 is determined by the speed of the planet carrier assembly member 246 and the tooth ratio of the planetary gear set 240. The fourth forward speed ratio is an overdrive ratio the numeric value of which is determined by the tooth ratio of the planetary gear set 240.

The fifth forward speed ratio is established by the engagement of the torque transmitting mechanisms 252 and 258. This connects the sun gear member 242 with the second continuous interconnection 272 and the sun gear member 232 with the input shaft. The sun gear member 242 and the planet carrier assembly members 236, 226 rotate in reverse at a speed determined by the speed of the sun gear member 232 and the tooth ratios of the planetary gear sets 230 and 220. The ring gear member 244 and the output shaft 16 rotate forwardly at a speed determined by the speed of the sun gear member 242, the speed of the planet carrier assembly member 246 and the tooth ratio of the planetary gear set 240. The fifth forward speed ratio is an overdrive ratio the numeric value of which is determined by the tooth ratios of the planetary gear sets 220, 230 and 240.

The sixth forward speed ratio is established by the engagement of the torque transmitting mechanisms 250 and 258. This connects the sun gear member 242 with the first continuous interconnection 270 and the sun gear member 232 with the input shaft 14. The sun gear member 242, the ring gear member 234, and the sun gear member 222 rotate in reverse at a speed determined by the speed of the sun gear member 232 and the tooth ratio of the planetary gear sets 220 and 230. The ring gear member 244 and the output shaft 16 rotate forwardly at a speed determined by the speed of the sun gear member 242, the speed of the planet carrier assembly member 246 and the tooth ratio of the planetary gear set 240. The sixth forward speed ratio is an overdrive ratio the numeric value of which is determined by the tooth ratios of the planetary gear sets 220, 230, and 240.

As can be determined from the truth table of FIG. 6, all of the single step ratio interchanges (first/second, second/third, etc.) in the forward direction are single transition interchanges. The truth table also describes the torque transmitting mechanisms necessary to complete each of the ratios and an example of the numeric values for each ratio when the given ring/sun tooth ratios are employed. FIG. 6 also provides an example of the ratio steps and the overall ratio spread when the given ratios are used.

Figures 7, 8:
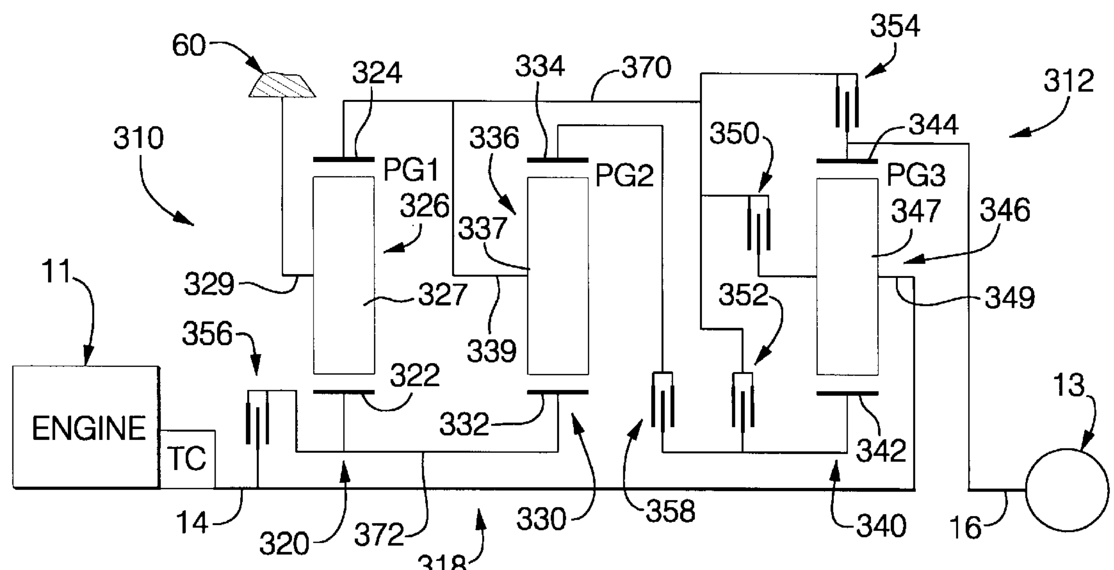
FIG. 7 is schematic representation of a powertrain incorporating another embodiment of the present invention.
FIG. 8 is a truth table and chart describing some of the operating characteristics of the powertrain depicted in FIG. 7.

A powertrain 310, shown in FIG. 7, includes a conventional engine 11, a multi-speed planetary transmission 312, and a conventional final drive 13. The multi-speed planetary transmission incorporates an input shaft 14, an output shaft 16 and a planetary gearing arrangement 318. The planetary gearing arrangement 318 has a first planetary gear set 320, a second planetary gear set 330 and a third planetary gear set 340. The planetary gearing arrangement 318 also includes five torque transmitting mechanisms 350, 352, 354, 356 and 358. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 320 includes a sun gear member 322, a ring gear member 324 and a planet carrier assembly member 326 that has a plurality of pinion gear members 327 rotatably mounted on a carrier member 329 and disposed in meshing relation with both the sun gear member 322 and the ring gear member 324. The planetary gear set 330 has a sun gear member 332, a ring gear member 334 and a planet carrier assembly member 336 that includes a plurality of pinion gear members 337 rotatably mounted on a carrier member 339 and disposed in meshing relation with both the sun gear member 332 and the ring gear member 334. The planetary gear set 340 includes a sun gear member 342, a ring gear member 344 and a planet carrier assembly member 346 that has a plurality of pinion gear members 347 rotatably mounted on a carrier member 349 and disposed in meshing relation with both the sun gear member 342 and the ring gear member 344.

The ring gear member 324 and the planet carrier assembly member 336 are continuously interconnected by a first continuous interconnection 370, the sun gear members 322 and 332 are continuously interconnected by a second continuous interconnection 372. The ring gear member 344 is continuously interconnected with the output shaft 16, and the planet carrier assembly member 346 is continuously interconnected with the input shaft 14. The planet carrier assembly member 326 is continuously interconnected with the grounding member 60. The first continuous interconnection 370 is selectively connectable with the ring gear member 344 and the output shaft 16 by the torque transmitting mechanism 354, selectively connectable with the planet carrier assembly member 346 and the input shaft 14 by the torque transmitting mechanism 350, and selectively connectable with the sun gear member 342 by the torque transmitting mechanism 352. The second continuous interconnection 372 is selectively connectable with the input shaft 14 and the planet carrier assembly member 346 by the torque transmitting mechanism 356. The sun gear member 342 and the ring gear member 334 are selectively interconnectable by the torque transmitting mechanism 358. The planetary gear set 320 has each member continuously connected with respective members of the planetary gear set 330 and the grounding member 60. The planetary gear set 330 has one member that is non-continuously connected. The planetary gear set 340 has two members continuously connected with the input shaft 14 and the output shaft 16, respectively, and one member that is non-continuously connected.

As shown in FIG. 8, the torque transmitting mechanisms 350, 352, 354, 356, and 358 are engaged in combinations of two to establish six forward speed ratios and a reverse speed ratio between the input shaft 14 and the output shaft 16. A neutral condition during which all of the torque transmitting mechanisms are released is also available. To establish the reverse ratio, the torque transmitting mechanisms 354 and 356 are engaged. This connects the second continuous interconnection 372 with the input shaft 14 and the sun gear member 322 and 332 and the first continuous interconnection 370 with the output shaft 16 and the ring gear member 344. The ring gear member 324, the ring gear member 344 and the output shaft 16 are rotated in reverse at a speed determined by the speed of the sun gear member and the tooth ratio of the planetary gear set 320.

The first forward speed ratio is established the engagement of the torque transmitting mechanisms 350 and 358, thereby connecting the planet carrier assembly member 346 and the input shaft 14 with the first continuous interconnection 370 and the sun gear member 342 with the ring gear member 334. The sun gear members 322 and 332 are rotated in reverse by the speed of the ring gear member 324 (input speed) and the tooth ratio of the planetary gear set 320. The ring gear member 334 and the sun gear member 342 are rotated forwardly by at a speed determined by the speed of the sun gear member 332, the speed of the planet carrier assembly member 336 and the tooth ratio of the planetary gear set 330. The ring gear member 344 and the output shaft 16 are rotated forwardly at a speed determined by the speed of the sun gear member 342, the speed of the planet carrier assembly member 346 and the tooth ratio of the planetary gear set 340. The first forward speed ratio is an underdrive ratio having a numeric value determined by the tooth ratios of the planetary gear sets 320, 330 and 340.

The second forward speed is established by the engagement of the torque transmitting mechanisms 354 and 358. This connects the first continuous interconnection 370 with the ring gear member 344 and the output shaft 16 and the sun gear member 342 with the ring gear member 334. The sun gear member 342 and the ring gear member 334 rotate forwardly at a speed determined by the tooth ratio of the planetary gear set 340; the sun gear members 332 and 322 rotate in reverse at a speed determined by the tooth ratio of planetary gear set 330; and the ring gear member 324, the ring gear member 344 and the output shaft 16 rotate forwardly at a speed determined by the speed of the planet carrier assembly member 346, the speed of the sun gear member 342 and the tooth ratio of the planetary gear set 340. The second forward speed ratio is an underdrive ratio having a numeric value determined by the tooth ratios of the planetary gear sets 320, 330, and 340.

The third forward speed ratio is established by the engagement of the torque transmitting mechanisms 352 and 354 which connects the sun gear member 342 directly with the ring gear member 344 and therefore places the planetary gear set 340 in a one to one ratio. Thus, the third forward speed ratio is a direct drive.

The fourth forward speed ratio is established by the engagement of the torque transmitting mechanisms 352 and 358. This connects the sun gear member 342 with the first continuous interconnection 370 and with the ring gear member 334. This effectively connects the sun gear member 342 with the grounding member 60. The ring gear member 344 is driven forwardly at an increased speed determined by the speed of the planet carrier assembly member 346 and the tooth ratio of the planetary gear set 340. The fourth forward speed ratio is an overdrive ratio having a numeric value determined by the tooth ratios of the planetary gear set 340.

The fifth forward speed ratio is established by the engagement of the torque transmitting mechanisms 352 and 356 which connects the sun gear member 342 with the first continuous interconnection 370 and the sun gear members 322 and 332 with the input shaft 14. The ring gear member 324 and the sun gear member 422 are driven in reverse at a speed determined by the speed of the sun gear member 322 and the tooth ratio of the planetary gear set 320. The ring gear member 344 is driven forwardly at an increased speed determined by the speed of the planet carrier assembly member 346, the speed of the sun gear member 342 and the tooth ratio of the planetary gear set 340. The fifth forward speed ratio is an overdrive ratio having a numeric value determined by the tooth ratios of the planetary gear sets 320 and 340.

The sixth forward speed ratio is established by the engagement of the torque transmitting mechanisms 356 and 358. This connects the input shaft 14 with the sun gear members 322 and 332 and the sun gear member 342 with the ring gear member 334. The ring gear member 324 and the planet carrier assembly member 336 are driven in reverse at a speed determined by the speed of the sun gear member 322 and the tooth ratio of the planetary gear set 320; the ring gear member 334 and the sun gear member 342 are driven in reverse at a speed determined by the speed of the sun gear member 332, the speed of the planet carrier assembly member 336 and the tooth ratio of the planetary gear set 330; and the ring gear member 344 and the output shaft 16 are driven forwardly at an increased speed determined by the speed of the planet carrier assembly member 346, the speed of the sun gear member 342 and the tooth ratio of the planetary gear set 340. The sixth forward speed ratio is determined by the tooth ratios of the planetary gear sets 320, 330 and 340.

As can be determined from the truth table of FIG. 8, all of the single step ratio interchanges (first/second, second/third, etc.) in the forward direction are single transition interchanges. The truth table also describes the torque transmitting mechanisms necessary to complete each of the ratios and an example of the numeric values for each ratio when the given ring/sun tooth ratios are employed. FIG. 8 also provides an example of the ratio steps and the overall ratio spread when the given ring/sun ratios are used.

Figures 9, 10:
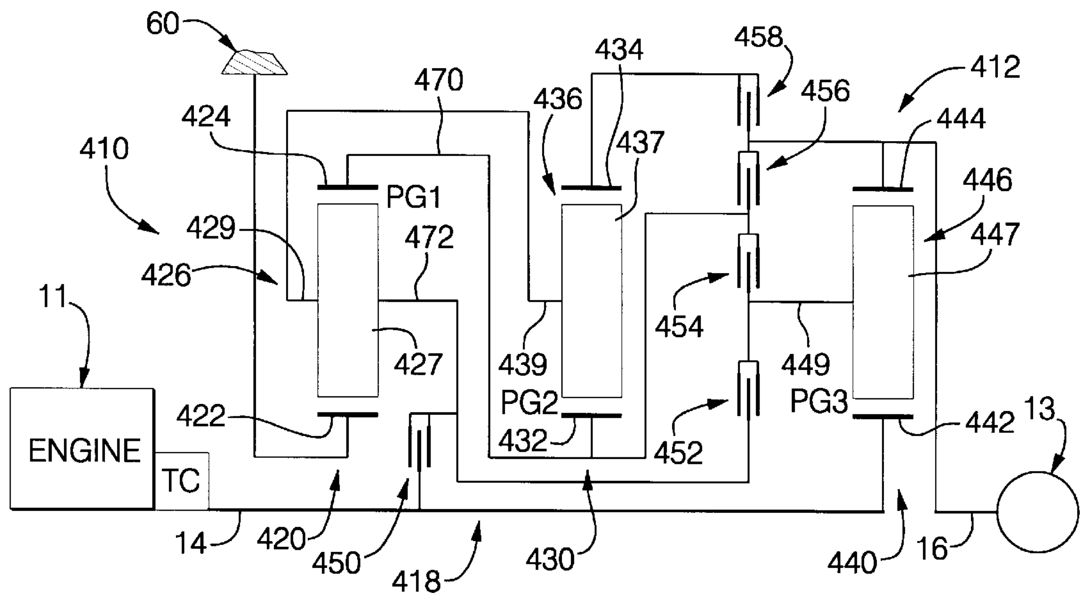
FIG. 9 is schematic representation of a powertrain incorporating another embodiment of the present invention.
FIG. 10 is a truth table and chart describing some of the operating characteristics of the powertrain depicted in FIG. 9.

A powertrain 410, shown in FIG. 9, includes a conventional engine 11, a multi-speed planetary transmission 412, and a conventional final drive 13. The multi-speed planetary transmission incorporates an input shaft 14, an output shaft 16 and a planetary gearing arrangement 418. The planetary gearing arrangement 418 has a first planetary gear set 420, a second planetary gear set 430 and a third planetary gear set 440. The planetary gearing arrangement 418 also consists of five torque transmitting mechanisms 450, 452, 454, 456, and 458. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 420 includes a sun gear member 422, a ring gear member 424 and a planet carrier assembly member 426 that has a plurality of pinion gear members 427 rotatably mounted on a carrier member 429 and disposed in meshing relation with both the sun gear member 422 and the ring gear member 424. The planetary gear set 430 has a sun gear member 432, a ring gear member 434 and a planet carrier assembly member 436 that includes a plurality of pinion gear members 437 rotatably mounted on a carrier member 439 and disposed in meshing relation with both the sun gear member 432 and the ring gear member 434. The planetary gear set 440 includes a sun gear member 442, a ring gear member 444 and a planet carrier assembly member 446 that has a plurality of pinion gear members 447 rotatably mounted on a carrier member 449 and disposed in meshing relation with both the sun gear member 442 and the ring gear member 444.

The ring gear member 444 is continuously connected with the output shaft 16 and the sun gear member 442 is continuously connected with the input shaft 14. The ring gear member 424 and the sun gear member 432 are continuously interconnected by a first continuous interconnection 470 and the planet carrier assembly members 426 and 436 are continuously interconnected by a second continuous interconnection 472. The sun gear member 422 is continuously connected with the grounding member 60. The first continuous interconnection 470 is selectively connectable with the planet carrier assembly member 446 through the torque transmitting mechanism 454 and is selectively connectable with the ring gear member 444 and the output shaft 16 through the torque transmitting mechanism 456. The second continuous interconnection 472 is selectively connectable with the input shaft 14 and the sun gear member 442 through the torque transmitting mechanism 450 and is selectively connectable with the planet carrier assembly member 446 through the torque transmitting mechanism 452. The ring gear member 434 is selectively connectable with the ring gear member 444 and the output shaft 16 through the torque transmitting mechanism 458. As is evident from the above description, the planetary gear set 420 has each member continuously connected with respective members of the planetary gear set 430 and the grounding member 60. The planetary gear set 430 has one member that is non-continuously connected. The planetary gear set 440 has two members continuously connected with the input shaft 14 and the output shaft 16, respectively, and one member that is non-continuously connected.

The truth table shown in FIG. 10 defines the torque transmitting mechanism engagement required for each of the forward speed ratios and the reverse speed ratio. As shown in FIG. 10, the torque transmitting mechanism 450, 452, 454, 456, and 458 are engaged in combinations of two to establish six forward speed ratios and a reverse speed ratio between the input shaft 14 and the output shaft 16. The truth table also indicates that the torque transmitting mechanism 454 can remain engaged during the neutral condition, thereby simplifying the first/reverse interchange. The numeric values for the ratios have been determined using the ring/sun tooth ratios given in FIG. 10. The R1/S1 value is the ring/sun tooth ratio of the planetary gear set 420, the R2/S2 value is the ring/sun tooth ratio of the planetary gear set 430, and the R3/S3 value is the ring/sun tooth ratio of the planetary gear set 440. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 10 also describes the step ratio between adjacent ratios, for example the numerical step between $1^{st}$ and $2^{nd}$ is 1.90.

Those skilled in the art will recognize that the numeric value of the reverse speed ratio is determined by the planetary gear set 440. The numeric value of the first forward speed ratio is determined by the planetary gear sets 420, 430 and 440. The numeric value of the second forward speed ratio is determined by the planetary gear sets 420, 430 and 440. The numeric value of the third forward speed ratio is determined by the planetary gear sets 420 and 430. The fourth forward speed ratio is a one-to-one ratio. The numeric value of the fifth forward speed ratio is determined by the planetary gear sets 420 and 430. The numeric value of the sixth forward speed ratio is determined by the planetary gear sets 420 and 440.

Figures 11, 12:
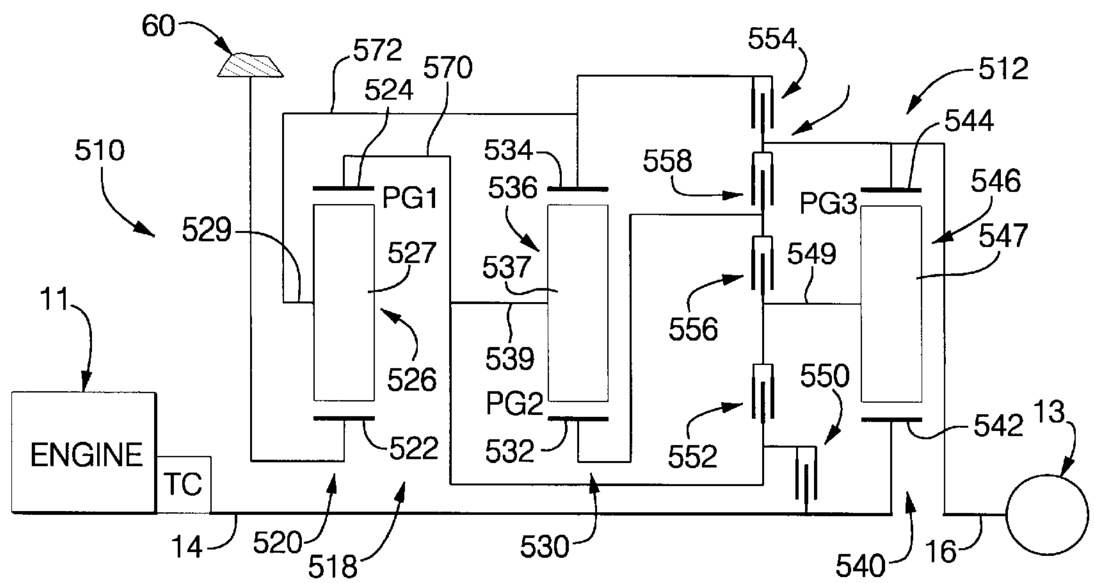
FIG. 11 is schematic representation of a powertrain incorporating another embodiment of the present invention.
FIG. 12 is a truth table and chart describing some of the operating characteristics of the powertrain depicted in FIG. 11.

A powertrain 510, shown in FIG. 11, includes a conventional engine 11, a multi-speed planetary transmission 512, and a conventional final drive 13. The multi-speed planetary transmission incorporates an input shaft 14, an output shaft 16 and a planetary gearing arrangement 518. The planetary gearing arrangement 518 has a first planetary gear set 520, a second planetary gear set 530 and a third planetary gear set 540. The planetary gearing arrangement 518 also includes five torque transmitting mechanisms 550, 552, 554, 556, and 558. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 520 includes a sun gear member 522, a ring gear member 524 and a planet carrier assembly member 526 that has a plurality of pinion gear members 527 rotatably mounted on a carrier member 529 and disposed in meshing relation with both the sun gear member 522 and the ring gear member 524. The planetary gear set 530 has a sun gear member 532, a ring gear member 534 and a planet carrier assembly member 536 that includes a plurality of pinion gear members 537 rotatably mounted on a carrier member 539 and disposed in meshing relation with both the sun gear member 532 and the ring gear member 534. The planetary gear set 540 includes a sun gear member 542, a ring gear member 544 and a planet carrier assembly member 546 that has a plurality of pinion gear members 547 rotatably mounted on a carrier member 549 and disposed in meshing relation with both the sun gear member 542 and the ring gear member 544.

The sun gear member 542 is continuously connected with the input shaft 14 and the ring gear member 544 is continuously connected with the output shaft 16. The sun gear member 522 is continuously connected with the grounding member 60. A first continuous interconnection 570 is continuously interconnecting the ring gear member 524 and the planet carrier assembly member 536. The planet carrier assembly member 526 and the ring gear member 534 are continuously interconnected by a second continuous interconnection 572. The input shaft and the sun gear member 542 are selectively connectable with the first continuous interconnection 570 through the torque transmitting mechanism 550. The planet carrier assembly member 546 and the first continuous interconnection 570 are selectively interconnected through the torque transmitting mechanism 552. the planet carrier assembly member 546 is selectively interconnected with the sun gear member 532 through the torque transmitting mechanism 556. The ring gear member 544 and the output shaft 16 are selectively connectable with the sun gear member 532 through the torque transmitting mechanism 558 and also selectively connectable with the second continuous interconnection 572 through the torque transmitting mechanism 554. The planetary gear set 520 has each member continuously connected with respective members of the planetary gear set 530 and the grounding member 60. The planetary gear set 530 has one member that is non-continuously connected. The planetary gear set 540 has two members continuously connected with the input shaft 14 and the output shaft 16, respectively, and one member that is non-continuously connected.

The truth table shown in FIG. 12 defines the torque transmitting mechanism engagement required for each of the forward speed ratios and the reverse speed ratio. As shown in FIG. 12 the torque transmitting mechanism 550, 552, 554, 556, and 558 are engaged in combinations of two to establish six forward speed ratios and a reverse speed ratio between the input shaft 14 and the output shaft 16. The truth table also indicates that the torque transmitting mechanism 556 can remain engaged during the neutral condition, thereby simplifying the first/reverse interchange. The numeric values for the ratios have been determined using the ring/sun tooth ratios given in FIG. 12. The R1/S1 value is the ring/sun tooth ratio of the planetary gear set 520, the R2/S2 value is the ring/sun tooth ratio of the planetary gear set 530, and the R3/S3 value is the ring/sun tooth ratio of the planetary gear set 540. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 12 also describes the step ratio between adjacent ratios, for example, the numerical step between $1^{st}$ and $2^{nd}$ is 1.80.

Those skilled in the art will recognize that the numeric value of the reverse speed ratio is determined by the planetary gear set 540. The numeric value of the first forward speed ratio is determined by the planetary gear sets 520, 530, and 540. The numeric value of the second forward speed ratio is determined by the planetary gear sets 520 and 540. The numeric value of the third forward speed ratio is determined by the planetary gear set 520. The fourth forward speed ratio is a one-to-one ratio. The numeric value of the fifth forward speed ratio is determined by the planetary gear sets 520 and 530. The numeric value of the sixth forward speed ratio is determined by the planetary gear sets 520, 530, and 540.

Figures 13, 14:
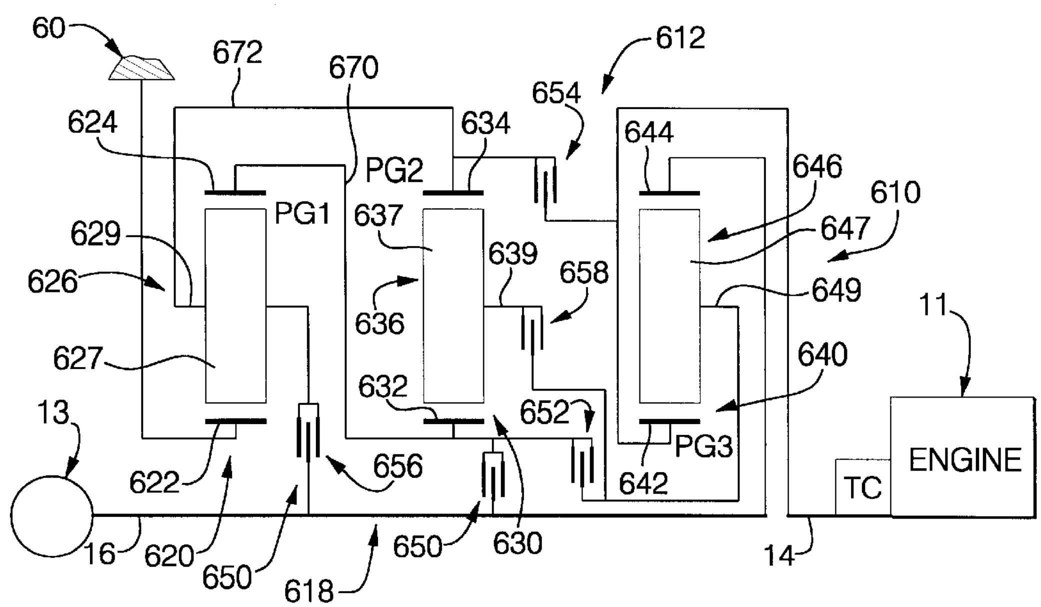
FIG. 13 is schematic representation of a powertrain incorporating another embodiment of the present invention.
FIG. 14 is a truth table and chart describing some of the operating characteristics of the powertrain depicted in FIG. 13.

A powertrain 610, shown in FIG. 13, includes a conventional engine 11, a multi-speed planetary transmission 612, and a conventional final drive 13. The multi-speed planetary transmission incorporates an input shaft 14, an output shaft 16 and a planetary gearing arrangement 618. The planetary gearing arrangement 618 has a first planetary gear set 620, a second planetary gear set 630 and a third planetary gear set 640. The planetary gearing arrangement 618 also consists of five torque transmitting mechanisms 650, 652, 654, 656, and 658. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 620 includes a sun gear member 622, a ring gear member 624 and a planet carrier assembly member 626 that has a plurality of pinion gear members 627 rotatably mounted on a carrier member 629 and disposed in meshing relation with both the sun gear member 622 and the ring gear member 624. The planetary gear set 630 has a sun gear member 632, a ring gear member 634 and a planet carrier assembly member 636 that includes a plurality of pinion gear members 637 rotatably mounted on a carrier member 639 and disposed in meshing relation with both the sun gear member 632 and the ring gear member 634. The planetary gear set 640 includes a sun gear member 642, a ring gear member 644 and a planet carrier assembly member 646 that has a plurality of pinion gear members 647 rotatably mounted on a carrier member 649 and disposed in meshing relation with both the sun gear member 642 and the ring gear member 644.

The sun gear member 642 is continuously connected with the input shaft 14, the ring gear member 646 is continuously connected with the output shaft 16, and the sun gear member 620 is continuously connected with the grounding member 60. A first continuous interconnection 670 continuously interconnects the ring gear member 624 with the sun gear member 632. A second continuous interconnection 672 continuously interconnects the planet carrier assembly member 624 with the ring gear member 634. The input shaft 14 and the sun gear member 642 are selectively connectable with the second continuous interconnection 672 through the torque transmitting mechanism 654. The ring gear member 644 and the output shaft are selectively connectable with the first continuous interconnection 670 through the torque transmitting mechanism 650 and are selectively connectable with the second continuous interconnection 672 through the torque transmitting mechanism 656. The planet carrier assembly member 646 is selectively connectable with the planet carrier assembly member 636 through the torque transmitting mechanism 658 and with the first continuous interconnection 670 through the torque transmitting mechanism 652. As is evident from the above description, the planetary gear set 620 has each member continuously connected with respective members of the planetary gear set 630 and the grounding member 60. The planetary gear set 630 has one member that is non-continuously connected. The planetary gear set 640 has two members continuously connected with the input shaft 14 and the output shaft 16, respectively, and one member that is non-continuously connected.

The truth table shown in FIG. 14 defines the torque transmitting mechanism engagement required for each of the forward speed ratios and the reverse speed ratio. As shown in FIG. 14, the torque transmitting mechanism 650, 652, 654, 656, and 658 are engaged in combinations of two to establish six forward speed ratios and a reverse speed ratio between the input shaft 14 and the output shaft 16. The truth table also indicates that the torque transmitting mechanism 652 can remain engaged during the neutral condition, thereby simplifying the first/reverse interchange. The numeric values for the ratios have been determined using the ring/sun tooth ratios given in FIG. 14. The R1/S1 value is the ring/sun tooth ratio of the planetary gear set 620, the R2/S2 value is the ring/sun tooth ratio of the planetary gear set 630, and the R3/S3 value is the ring/sun tooth ratio of the planetary gear set 640. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 14 also describes the step ratio between adjacent ratios, for example, the numerical step between $1^{st}$ and $2^{nd}$ is 1.78.

Those skilled in the art will recognize that the numeric value of the reverse speed ratio is determined by the planetary gear set 640. The numeric value of the first forward speed ratio is determined by the planetary gear sets 620 and 640. The numeric value of the second forward speed ratio is determined by the planetary gear sets 620, 630, and 640. The third forward speed ratio is a one-to-one ratio. The numeric value of the fourth forward speed ratio is determined by the planetary gear sets 620, 630, and 640. The numeric value of the fifth forward speed ratio is determined by the planetary gear set 620. The numeric value of the sixth forward speed ratio is determined by the planetary gear sets 620 and 640.

Figures 15, 16:
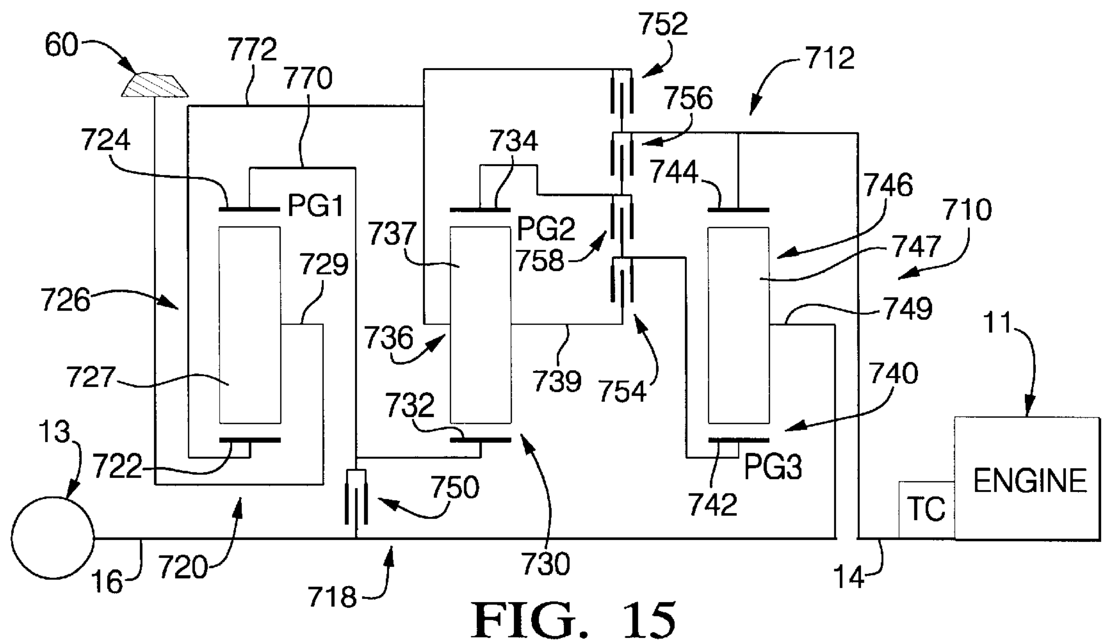
FIG. 15 is schematic representation of a powertrain incorporating another embodiment of the present invention.
FIG. 16 is a truth table and chart describing some of the operating characteristics of the powertrain depicted in FIG. 15.

A powertrain 710, shown in FIG. 15, includes a conventional engine 11, a multi-speed planetary transmission 712, and a conventional final drive 13. The multi-speed planetary transmission incorporates an input shaft 14, an output shaft 16 and a planetary gearing arrangement 718. The planetary gearing arrangement 718 has a first planetary gear set 720, a second planetary gear set 730 and a third planetary gear set 740. The planetary gearing arrangement 718 also includes five torque transmitting mechanisms 750, 752, 754, 756, and 758. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 720 includes a sun gear member 722, a ring gear member 724 and a planet carrier assembly member 726 that has a plurality of pinion gear members 727 rotatably mounted on a carrier member 729 and disposed in meshing relation with both the sun gear member 722 and the ring gear member 724. The planetary gear set 730 has a sun gear member 732, a ring gear member 734 and a planet carrier assembly member 736 that includes a plurality of pinion gear members 737 rotatably mounted on a carrier member 739 and disposed in meshing relation with both the sun gear member 732 and the ring gear member 734. The planetary gear set 740 includes a sun gear member 742, a ring gear member 744 and a planet carrier assembly member 746 that has a plurality of pinion gear members 747 rotatably mounted on a carrier member 749 and disposed in meshing relation with both the sun gear member 742 and the ring gear member 744.

The input shaft is continuously connected with the ring gear member 744, selectively connectable with the ring gear member 734 through the torque transmitting mechanism 756, and selectively connectable with a second continuous interconnection 772 through the torque transmitting mechanism 752. The output shaft 16 is continuously connected with the planet carrier assembly member 746 and is selectively connectable with a first continuous interconnection 770 through the torque transmitting mechanism 750. The ring gear member 724 and the sun gear member 732 are continuously interconnected by the first continuous interconnection 770. The planet carrier assembly member 726 is continuously connected with the grounding member 60. The sun gear member 722 and the planet carrier assembly member 736 are continuously interconnected by the second continuous interconnection 772. As is now apparent from the above description, the planetary gear set 720 has each member continuously connected with members of the planetary gear set 730 and the grounding member 60, respectively. The planetary gear set 730 has one member that is non-continuously connected. The planetary gear set 740 has two members continuously connected with the input shaft 14 and the output shaft 16, respectively, and one member that is non-continuously connected.

The truth table shown in FIG. 16 defines the torque transmitting mechanism engagement required for each of the forward speed ratios and the reverse speed ratio. As shown in FIG. 16, the torque transmitting mechanism 750, 752, 754, 756, and 758 are engaged in combinations of two to establish six forward speed ratios and a reverse speed ratio between the input shaft 14 and the output shaft 16. The truth table also indicates that the torque transmitting mechanism 750 can remain engaged during the neutral condition, thereby simplifying the first/reverse interchange. The numeric values for the ratios have been determined using the ring/sun tooth ratios given in FIG. 16. The R1/S1 value is the ring/sun tooth ratio of the planetary gear set 720, the R2/S2 value is the ring/sun tooth ratio of the planetary gear set 730, and the R3/S3 value is the ring/sun tooth ratio of the planetary gear set 740. As can be determined from the truth table, the single ratio interchanges for the forward speed ratios are single transition interchanges. Also, double step interchanges except for the $4^{th}$ to $6^{th}$ are single transition interchanges. FIG. 16 also describes the step ratio between adjacent ratios, for example, the numerical step between $1^{st}$ and $2^{nd}$ is 1.42.

Those skilled in the art will recognize that the numeric value of the reverse speed ratio is determined by the planetary gear set 720. The numeric value of the first forward speed ratio is determined by the planetary gear sets 720, 730, and 740. The numeric value of the second forward speed ratio is determined by the planetary gear sets 720 and 740. The numeric value of the third forward speed ratio is determined by the planetary gear set 740. The numeric value of the fourth forward speed ratio is determined by the planetary gear sets 720, 730, and 740. The fifth forward speed ratio is a one-to-one ratio. The numeric value of the sixth forward speed ratio is determined by the planetary gear sets 720, 730, and 740.

Figures 17, 18:
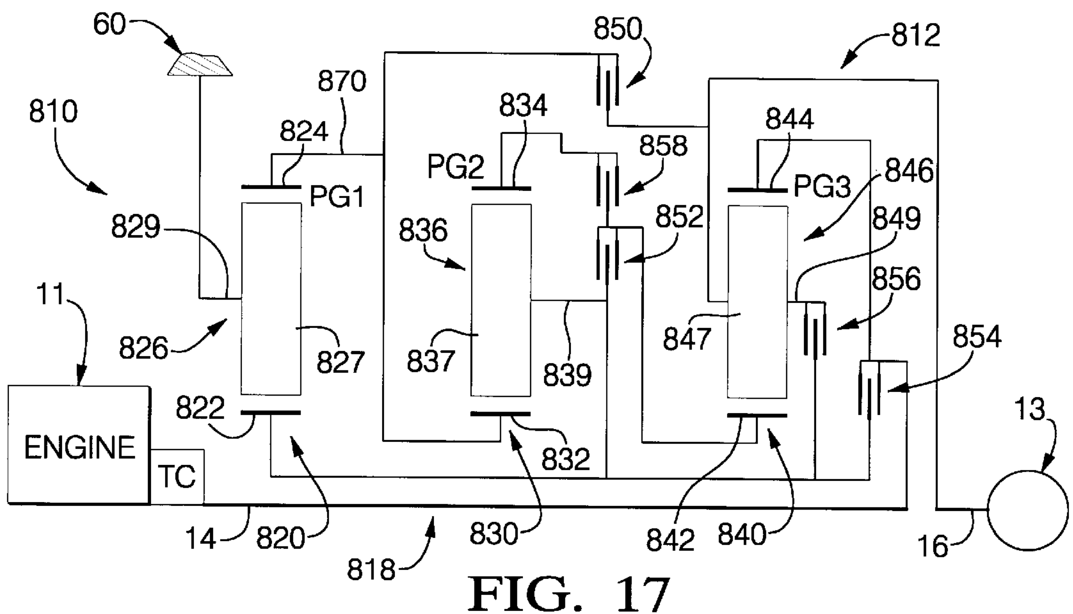
FIG. 17 is schematic representation of a powertrain incorporating another embodiment of the present invention.
FIG. 18 is a truth table and chart describing some of the operating characteristics of the powertrain depicted in FIG. 17.

A powertrain 810, shown in FIG. 17, includes a conventional engine 11, a multi-speed planetary transmission 812, and a conventional final drive 13. The multi-speed planetary transmission incorporates an input shaft 14, an output shaft 16 and a planetary gearing arrangement 818. The planetary gearing arrangement 818 has a first planetary gear set 820, a second planetary gear set 830 and a third planetary gear set 840. The planetary gearing arrangement 818 also consists of five torque transmitting mechanisms 850, 852, 854, 856, and 858. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 820 includes a sun gear member 822, a ring gear member 824 and a planet carrier assembly member 826 that has a plurality of pinion gear members 827 rotatably mounted on a carrier member 829 and disposed in meshing relation with both the sun gear member 822 and the ring gear member 824. The planetary gear set 830 has a sun gear member 832, a ring gear member 834 and a planet carrier assembly member 836 that includes a plurality of pinion gear members 837 rotatably mounted on a carrier member 839 and disposed in meshing relation with both the sun gear member 832 and the ring gear member 834. The planetary gear set 840 includes a sun gear member 842, a ring gear member 844 and a planet carrier assembly member 846 that has a plurality of pinion gear members 847 rotatably mounted on a carrier member 849 and disposed in meshing relation with both the sun gear member 842 and the ring gear member 844.

The input shaft 14 is continuously connected with the ring gear member 844 and selectively connectable with a second continuous interconnection 872 through the torque transmitting mechanism 854. The output shaft 16 is continuously connected with the planet carrier assembly member 846, selectively connectable with the planet carrier assembly member 836 through the torque transmitting mechanism 856, and selectively connectable with a first continuous interconnection 870 through the torque transmitting mechanism 850. The sun gear member 842 is selectively connectable with the second continuous interconnection 872 through the torque transmitting mechanism 852 and is selectively connectable with the ring gear member 834 through the torque transmitting mechanism 858. From the above description, it is evident that the planetary gear set 820 has respective members continuously connected with respective members of the planetary gear set 830 and the grounding member 60. The planetary gear set 830 has one member that is non-continuously connected. The planetary gear set 840 has two members continuously connected with the input shaft 14 and the output shaft 16, respectively, and one member that is non-continuously connected.

The truth table shown in FIG. 18 defines the torque transmitting mechanism engagement required for each of the forward speed ratios and the reverse speed ratio. As shown in FIG. 18, the torque transmitting mechanism 850, 852, 854, 856, and 858 are engaged in combinations of two to establish six forward speed ratios and a reverse speed ratio between the input shaft 14 and the output shaft 16. The truth table also indicates that the torque transmitting mechanism 850 can remain engaged during the neutral condition, thereby simplifying the first/reverse interchange. The numeric values for the ratios have been determined using the ring/sun tooth ratios given in FIG. 18. The R1/S1 value is the ring/sun tooth ratio of the planetary gear set 820, the R2/S2 value is the ring/sun tooth ratio of the planetary gear set 830, and the R3/S3 value is the ring/sun tooth ratio of the planetary gear set 840. As can be determined from the truth table, the single ratio interchanges for the forward speed ratios are single transition interchanges. Also, the double step interchanges, with the exception of the $4^{th}$ to $6^{th}$, are single transition interchanges. FIG. 18 also describes the step ratio between adjacent ratios, for example, the numerical step between $1^{st}$ and $2^{nd}$ is 1.41.

Those skilled in the art will recognize that the numeric value of the reverse speed ratio is determined by the planetary gear set 820. The numeric value of the first forward speed ratio is determined by the planetary gear sets 820, 830, and 840. The numeric value of the second forward speed ratio is determined by the planetary gear sets 820 and 840. The numeric value of the third forward speed ratio is determined by the planetary gear set 840. The fourth forward speed ratio is a one-to-one ratio. The numeric value of the fifth forward speed ratio is determined by the planetary gear sets 820, 830, and 840. The numeric value of the sixth forward speed ratio is determined by the planetary gear sets 820, 830, and 840.

Figures 19, 20:
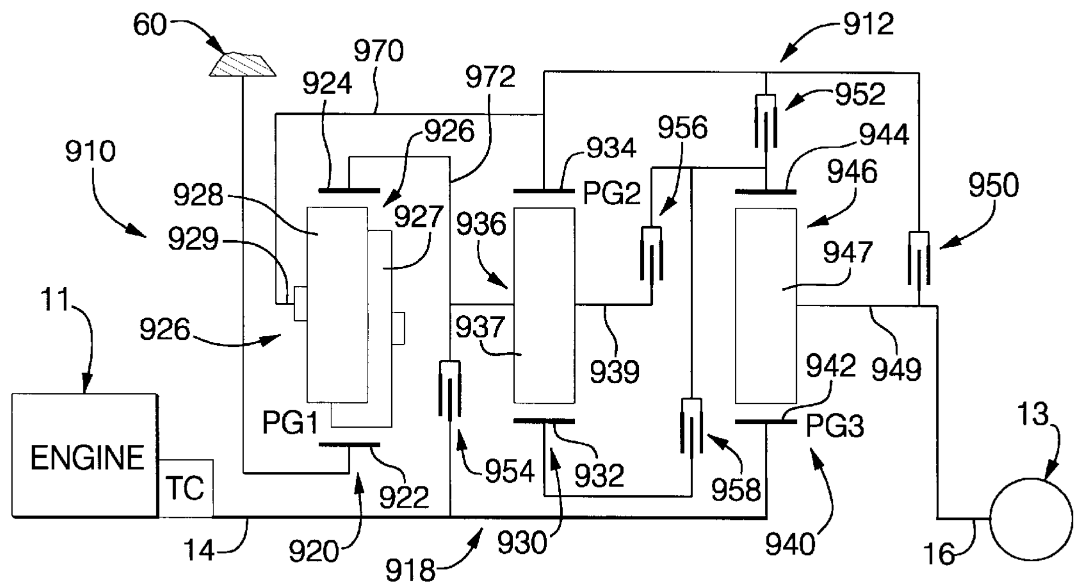
FIG. 19 is schematic representation of a powertrain incorporating another embodiment of the present invention.
FIG. 20 is a truth table and chart describing some of the operating characteristics of the powertrain depicted in FIG. 19.

A powertrain 910, shown in FIG. 19, includes a conventional engine 11, a multi-speed planetary transmission 912, and a conventional final drive 13. The multi-speed planetary transmission incorporates an input shaft 14, an output shaft 16 and a planetary gearing arrangement 918. The planetary gearing arrangement 918 has a first planetary gear set 920, a second planetary gear set 930 and a third planetary gear set 940. The planetary gearing arrangement 918 also consist of five torque transmitting mechanisms 950, 952, 954, 956, and 958. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 920 includes a sun gear member 922, a ring gear member 924 and a planet carrier assembly member 926 that has a plurality of intermeshing pinion gear 927 and 928 rotatably mounted on a carrier member 929. The pinion gears 927 are disposed in meshing relation with the sun gear member 922 and the pinion gears 928 are disposed in meshing relation with the ring gear member 924. The planetary gear set 930 has a sun gear member 932, a ring gear member 934 and a planet carrier assembly member 936 that includes a plurality of pinion gear members 937 rotatably mounted on a carrier member 939 and disposed in meshing relation with both the sun gear member 932 and the ring gear member 934. The planetary gear set 940 includes a sun gear member 942, a ring gear member 944 and a planet carrier assembly member 946 that has a plurality of pinion gear members 947 rotatably mounted on a carrier member 949 and disposed in meshing relation with both the sun gear member 942 and the ring gear member 944.

The input shaft 14 is continuously connected with the sun gear member 942 and selectively connectable with a first continuous interconnection 970 through a torque transmitting mechanism 954. The output shaft 16 is continuously connected with the planet carrier assembly member 946 and selectively connectable with a second continuous interconnection 972 through the torque transmitting mechanism 950. The ring gear member 944 is selectively connectable with the first continuous interconnection 970 through the torque transmitting mechanism 956, with the second continuous interconnection 972 through the torque transmitting mechanism 952, and with the sun gear member 932 through the torque transmitting mechanism 958. As is evident from the above description, the planetary gear set 920 has each member continuously connected with respective members of the planetary gear set 930 and the grounding member 60. The planetary gear set 930 has one member that is non-continuously connected. The planetary gear set 940 has two members continuously connected with the input shaft 14 and the output shaft 16, respectively, and one member that is non-continuously connected.

The truth table shown in FIG. 20 defines the torque transmitting mechanism engagement required for each of the forward speed ratios and the reverse speed ratio. As shown in FIG. 20, the torque transmitting mechanism 950, 952, 954, 956, and 958 are engaged in combinations of two to establish six forward speed ratios and a reverse speed ratio between the input shaft 14 and the output shaft 16. The truth table also indicates that the torque transmitting mechanism 958 can remain engaged during the neutral condition, thereby simplifying the first/reverse interchange. The numeric values for the ratios have been determined using the ring/sun tooth ratios given in FIG. 20. The R1/S1 value is the ring/sun tooth ratio of the planetary gear set 920, the R2/S2 value is the ring/sun tooth ratio of the planetary gear set 930, and the R3/S3 value is the ring/sun tooth ratio of the planetary gear set 940. As can be determined from the truth table, the single ratio interchanges for the forward speed ratios are single transition interchanges. Also, double step interchanges, with the exception of the $3^{rd}$ to $5^{th}$ interchange, are single transition interchanges. FIG. 20 also describes the step ratio between adjacent ratios, for example, the numerical step between $1^{st}$ and $2^{nd}$ is 1.43.

Those skilled in the art will recognize that the numeric value of the reverse speed ratio is determined by the planetary gear sets 920, 930, and 940. The numeric value of the first forward speed ratio is determined by the planetary gear sets 920, 930, and 940. The numeric value of the second forward speed ratio is determined by the planetary gear set 940. The numeric value of the third forward speed ratio is determined by the planetary gear sets 920 and 940. The fourth forward speed ratio is a one-to-one ratio. The numeric value of the fifth forward speed ratio is determined by the planetary gear sets 920 and 940. The numeric value of the sixth forward speed ratio is determined by the planetary gear set 920.

Figures 21, 22:
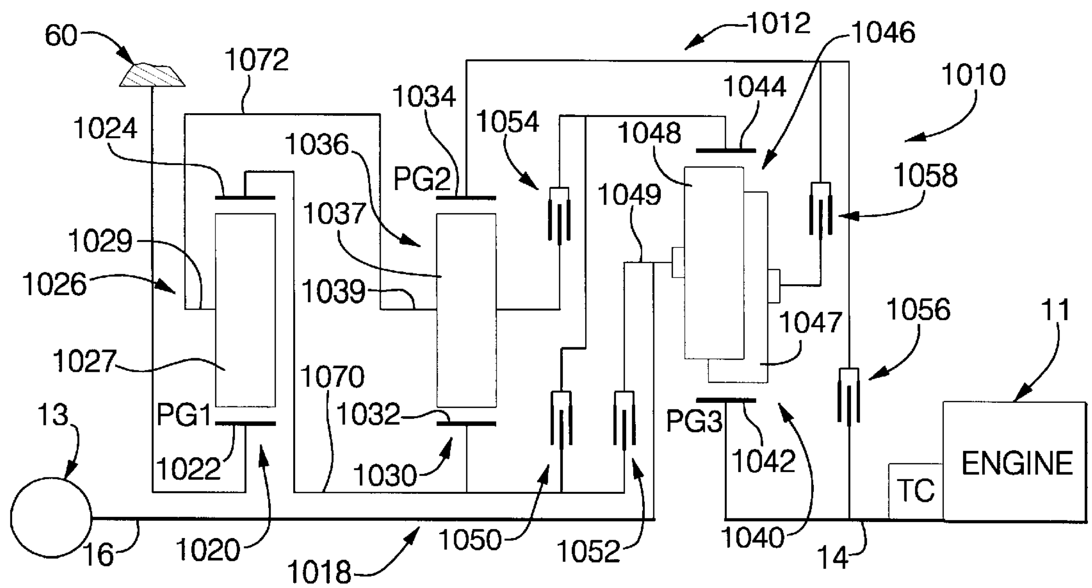
FIG. 21 is schematic representation of a powertrain incorporating another embodiment of the present invention.
FIG. 22 is a truth table and chart describing some of the operating characteristics of the powertrain depicted in FIG. 21.

A powertrain 1010, shown in FIG. 21, includes a conventional engine 11, a multi-speed planetary transmission 1012, and a conventional final drive 13. The multi-speed planetary transmission incorporates an input shaft 14, an output shaft 16 and a planetary gearing arrangement 1018. The planetary gearing arrangement 1018 has a first planetary gear set 1020, a second planetary gear set 1030 and a third planetary gear set 1040. The planetary gearing arrangement 1018 also includes five torque transmitting mechanisms 1050, 1052, 1054, 1056, and 1058. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 1020 includes a sun gear member 1022, a ring gear member 1024 and a planet carrier assembly member 1026 that has a plurality of pinion gear members 1027 rotatably mounted on a carrier member 1029 and disposed in meshing relation with both the sun gear member 1022 and the ring gear member 1024. The planetary gear set 1030 has a sun gear member 1032, a ring gear member 1034 and a planet carrier assembly member 1036 that includes a plurality of pinion gear members 1037 rotatably mounted on a carrier member 1039 and disposed in meshing relation with both the sun gear member 1032 and the ring gear member 1034. The planetary gear set 1040 includes a sun gear member 1042, a ring gear member 1044 and a planet carrier assembly member 1046 that has a plurality of intermeshing pinion gear members 1047, 1048 that are rotatably mounted on a carrier member 1049. The pinion gear member 1047 is disposed in meshing relation with both the sun gear member 1042 and the pinion gear member 1048 is disposed in meshing relation with the ring gear member 1044.

The input shaft 14 is continuously connected with the sun gear member 1042 and is selectively connectable with the ring gear member 1034 through the torque transmitting mechanism 1056. The output shaft 16 is continuously connected with the planet carrier assembly member 1046, selectively connectable with a first continuous interconnection 1070 through the torque transmitting mechanism 1052, and selectively connectable with the ring gear member 1034 through the torque transmitting mechanism 1058. The sun gear member 1022 is continuously connected with the grounding member 60. The sun gear member 1032 and the ring gear member 1024 are continuously interconnected by the first continuous interconnection 1070 and selectively connectable with the ring gear member 1044 through the torque transmitting mechanism 1050. The planet carrier assembly members 1026 and 1036 are continuously interconnected by a second continuous interconnection 1072 and selectively connectable to the ring gear member 1044 through the torque transmitting mechanism 1054. Those skilled in the art will recognize that the planetary gear set 1020 has each member continuously connected with respective members of the planetary gear set 1030 and the grounding member 60; the planetary gear set 1030 has one member that is non-continuously connected; the planetary gear set 1040 has two members continuously connected with the input shaft 14 and the output shaft 16, respectively, and one member that is non-continuously connected.

The truth table shown in FIG. 22 defines the torque transmitting mechanism engagement required for each of the forward speed ratios and the reverse speed ratio. As shown in FIG. 22, the torque transmitting mechanism 1050, 1052, 1054, 1056, and 1058 are engaged in combinations of two to establish six forward speed ratios and a reverse speed ratio between the input shaft 14 and the output shaft 16. The truth table also indicates that the torque transmitting mechanism 1050 can remain engaged during the neutral condition, thereby simplifying the first/reverse interchange. The numeric values for the ratios have been determined using the ring/sun tooth ratios given in FIG. 22. The R1/S1 value is the ring/sun tooth ratio of the planetary gear set 1020, the R2/S2 value is the ring/sun tooth ratio of the planetary gear set 1030, and the R3/S3 value is the ring/sun tooth ratio of the planetary gear set 1040. As can be determined from the truth table, the single ratio interchanges for the forward speed ratios are single transition interchanges. Also, the double step interchanges, such as $1^{st}$ to $3^{rd}$, $2^{nd}$ to $4^{th}$, $3^{rd}$ to $5^{th}$, and $4^{th}$ to $6^{th}$ are single transition interchanges. FIG. 22 also describes the step ratio between adjacent ratios, for example, the numerical step between $1^{st}$ and $2^{nd}$ is 1.88.

Those skilled in the art will recognize that the numeric value of the reverse speed ratio is determined by the planetary gear set 1040. The numeric value of the first forward speed ratio is determined by the planetary gear sets 1020, 1030, and 1040. The numeric value of the second forward speed ratio is determined by the planetary gear sets 1020, 1030, and 1040. The third forward speed ratio is a one to one ratio. The numeric value of the fourth forward speed ratio is determined by the planetary gear sets 1020, 1030, and 1040. The numeric value of the fifth forward speed ratio is determined by the planetary gear sets 1020 and 1030. The numeric value of the sixth forward speed ratio is determined by the planetary gear sets 1020, 1030, and 1040.

Figures 23, 24:
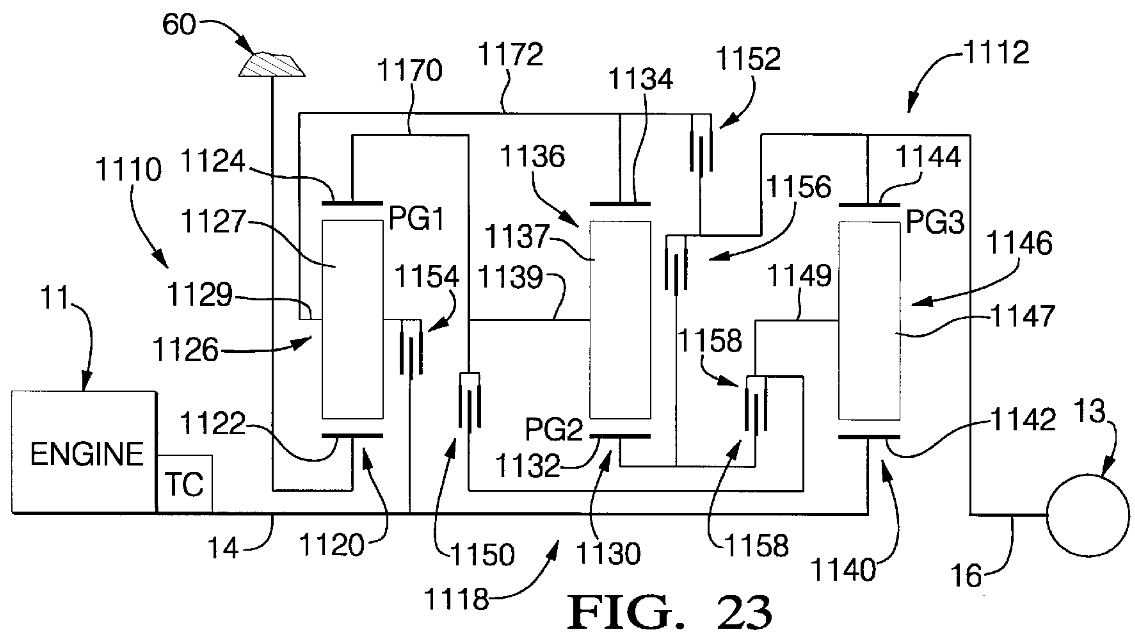
FIG. 23 is schematic representation of a powertrain incorporating another embodiment of the present invention.
FIG. 24 is a truth table and chart describing some of the operating characteristics of the powertrain depicted in FIG. 23.

A powertrain 1110, shown in FIG. 23, includes a conventional engine 11, a multi-speed planetary transmission 1112, and a conventional final drive 13. The multi-speed planetary transmission incorporates an input shaft 14, an output shaft 16 and a planetary gearing arrangement 1118. The planetary gearing arrangement 1118 has a first planetary gear set 1120, a second planetary gear set 1130 and a third planetary gear set 1140. The planetary gearing arrangement 1118 also consists of five torque transmitting mechanisms 1150, 1152, 1154, 1156, and 1158. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 1120 includes a sun gear member 1122, a ring gear member 1124 and a planet carrier assembly member 1126 that has a plurality of pinion gear members 1127 rotatably mounted on a carrier member 1129 and disposed in meshing relation with both the sun gear member 1122 and the ring gear member 1124. The planetary gear set 1130 has a sun gear member 1132, a ring gear member 1134 and a planet carrier assembly member 1136 that includes a plurality of pinion gear members 1137 rotatably mounted on a carrier member 1139 and disposed in meshing relation with both the sun gear member 1132 and the ring gear member 1134. The planetary gear set 1140 includes a sun gear member 1142, a ring gear member 1144 and a planet carrier assembly member 1146 that has a plurality of pinion gear members 1147 rotatably mounted on a carrier member 1149 and disposed in meshing relation with both the sun gear member 1142 and the ring gear member 1144.

The input shaft 14 is continuously connected with the sun gear member 1140. The output shaft 16 is continuously connected with the ring gear member 1144. The sun gear member 1122 is continuously connected with the grounding member 60. A first continuous interconnection 1170 continuously interconnects the ring gear member 1124 and the planet carrier assembly member 1136 and is selectively connectable with the planet carrier assembly member 1146 through the torque transmitting mechanism 1150. A second continuous interconnection 1172 is continuously interconnected between the planet carrier assembly member 1126 and the ring gear member 1134, selectively connectable with the input shaft 14 through the torque transmitting mechanism 1154, and selectively connectable with the ring gear member 1144 and the output shaft 14 through the torque transmitting mechanism 1152. The sun gear member 1132 is selectively connectable with the planet carrier assembly member 1146 through the torque transmitting mechanism 1158 and selectively connectable with the ring gear member 1144 and the output shaft 16 through the torque transmitting mechanism 1156. The planetary gear set 1120 has each member continuously connected with respective members of the planetary gear set 1130 and the grounding member 60. The planetary gear set 1130 has one member that is non-continuously connected. The planetary gear set 1140 has two members continuously connected with the input shaft 14 and the output shaft 16, respectively, and one member that is non-continuously connected.

The truth table shown in FIG. 24 defines the torque transmitting mechanism engagement required for each of the forward speed ratios and the reverse speed ratio. As seen in FIG. 24, the torque transmitting mechanisms 1150, 1152, 1154, 1156, and 1158 are engaged in combinations of two to provide seven forward speed ratios and one reverse ratio. The truth table also indicates that the torque transmitting mechanism 1158 can remain engaged during the neutral condition, thereby simplifying the first/reverse interchange. The numeric values for the ratios have been determined using the ring/sun tooth ratios given in FIG. 24. The R1/S1 value is the ring/sun tooth ratio of the planetary gear set 1120, the R2/S2 value is the ring/sun tooth ratio of the planetary gear set 1130, and the R3/S3 value is the ring/sun tooth ratio of the planetary gear set 1140. As can be determined from the truth table, the single ratio interchanges for the forward speed ratios, with the exception of the $6^{th}$ to $7^{th}$ interchange, are single transition interchanges. Also, double step interchanges such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$ are single transition interchanges. FIG. 24 also describes the step ratio between adjacent ratios, for example, the numerical step between $1^{st}$ and $2^{nd}$ is 1.72.

Those skilled in the art will recognize that the numeric value of the reverse speed ratio is determined by the planetary gear set 1140. The numeric value of the first forward speed ratio is determined by the planetary gear sets 1120, 1130, and 1140. The numeric value of the second forward speed ratio is determined by the planetary gear sets 1120 and 1140. The third forward speed ratio is a one-to-one ratio. The numeric value of the fourth forward speed ratio is determined by the planetary gear sets 1120 and 1140. The numeric value of the fifth forward speed ratio is determined by the planetary gear sets 1120 and 1130. The numeric value of the sixth forward speed ratio is determined by the planetary gear sets 1120, 1130, and 1140. The numeric value of the seventh forward speed ratio is determined by the planetary gear sets 1120, 1130, and 1140.

Figures 25, 26:
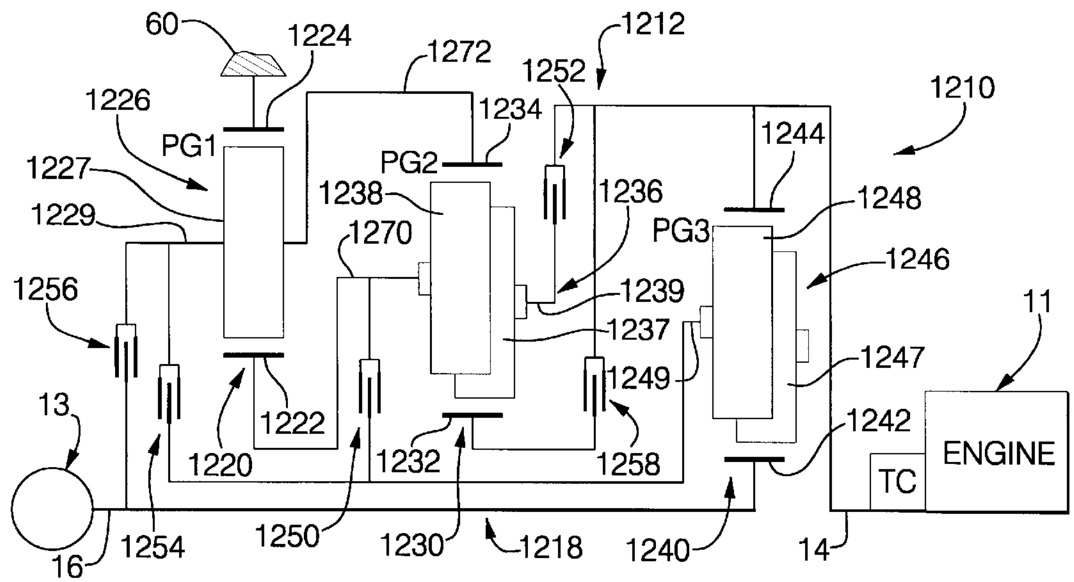
FIG. 25 is schematic representation of a powertrain incorporating another embodiment of the present invention.
FIG. 26 is a truth table and chart describing some of the operating characteristics of the powertrain depicted in FIG. 25.

A powertrain 1210, shown in FIG. 25, includes a conventional engine 11, a multi-speed planetary transmission 1212, and a conventional final drive 13. The multi-speed planetary transmission incorporates an input shaft 14, an output shaft 16 and a planetary gearing arrangement 1218. The planetary gearing arrangement 1218 has a first planetary gear set 1220, a second planetary gear set 1230 and a third planetary gear set 1240. The planetary gearing arrangement 1218 also includes five torque transmitting mechanisms 1250, 1252, 1254, 1256, and 1258. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 1220 includes a sun gear member 1222, a ring gear member 1224 and a planet carrier assembly member 1226 that has a plurality of pinion gear members 1227 rotatably mounted on a carrier member 1229 and disposed in meshing relation with both the sun gear member 1222 and the ring gear member 1224. The planetary gear set 1230 has a sun gear member 1232, a ring gear member 1234 and a planet carrier assembly member 1236 that includes a plurality of intermeshing pinion gear members 1237 and 1238 rotatably mounted on a carrier member 1239. The pinion gear members 1237 are disposed in meshing relation with the sun gear member 1232 and the pinion gear members 1238 are disposed in meshing relation with the ring gear member 1234. The planetary gear set 1240 includes a sun gear member 1242, a ring gear member 1244 and a planet carrier assembly member 1246 that has a plurality of intermeshing pinion gear members 1247 and 1248 rotatably mounted on a carrier member 1249. The pinion gear members 1247 are disposed in meshing relation with the sun gear member 1242 and the pinion gear members 1248 are disposed in meshing relation with the ring gear member 1244.

The sun gear member 1222 is continuously interconnected connected with the planet carrier assembly member 1236 by a first continuous interconnection 1270. The planet carrier assembly member 1226 and the ring gear member 1234 are continuously interconnected by a second continuous interconnection 1272. The ring gear member 1244 is continuously connected with the input shaft 14, selectively connectable with the first continuous interconnection 1270 through the torque transmitting mechanism 1252, and selectively connectable with the sun gear member 1232 through the torque transmitting mechanism 1258. The output shaft 16 is continuously connected with the sun gear member 1242 and selectively connectable with the second continuous interconnection 1272 through the torque transmitting mechanism 1256. The ring gear member 1224 is continuously connected with the grounding member 60. The planet carrier assembly member 1246 is selectively connectable with the first continuous interconnection 1270 through the torque transmitting mechanism 1250 and is selectively connectable with the second continuous interconnection 1270 through the torque transmitting mechanism 1254. The planetary gear set 1220 has members continuously interconnected with respective members of the planetary gear set 1230 and the grounding member 60. The planetary gear set 1230 has one member that is non-continuously connected. The planetary gear set 1240 has two members continuously connected with the input shaft 14 and the output shaft 16, respectively, and one member that is non-continuously connected.

The truth table shown in FIG. 26 defines the torque transmitting mechanism engagement required for each of the forward speed ratios and the reverse speed ratio. As shown in FIG. 26, the torque transmitting mechanism 1250, 1252, 1254, 1256, and 1258 are engaged in combinations of two to establish seven forward speed ratios and a reverse speed ratio between the input shaft 14 and the output shaft 16. The truth table also indicates that the torque transmitting mechanism 1256 can remain engaged during the neutral condition, thereby simplifying the first/reverse interchange. The numeric values for the ratios have been determined using the ring/sun tooth ratios given in FIG. 26. The R1/S1 value is the ring/sun tooth ratio of the planetary gear set 1220, the R2/S2 value is the ring/sun tooth ratio of the planetary gear set 1230, and the R3/S3 value is the ring/sun tooth ratio of the planetary gear set 1240. As can be determined from the truth table, the single ratio interchanges for the forward speed ratios are single transition interchanges. Also, the double step interchanges, with the exception of $2^{nd}$ to $4^{th}$, are single transition interchanges. FIG. 26 also describes the step ratio between adjacent ratios, for example, the numerical step between $1^{st}$ and $2^{nd}$ is 1.52.

Those skilled in the art will recognize that the numeric value of the reverse speed ratio is determined by the planetary gear sets 1220 and 1230. The numeric value of the first forward speed ratio is determined by the planetary gear sets 1220 and 1230. The numeric value of the second forward speed ratio is determined by the planetary gear sets 1220 and 1240. The third forward speed ratio is a one-to-one ratio. The numeric value of the fourth forward speed ratio is determined by the planetary gear sets 1220 and 1240. The numeric value of the fifth forward speed ratio is determined by the planetary gear set 1240. The numeric value of the sixth forward speed ratio is determined by the planetary gear sets 1220, 1230, and 1240. The numeric value of the seventh forward speed ratio is determined by the planetary gear sets 1220, 1230, and 1240.

Figures 27, 28:
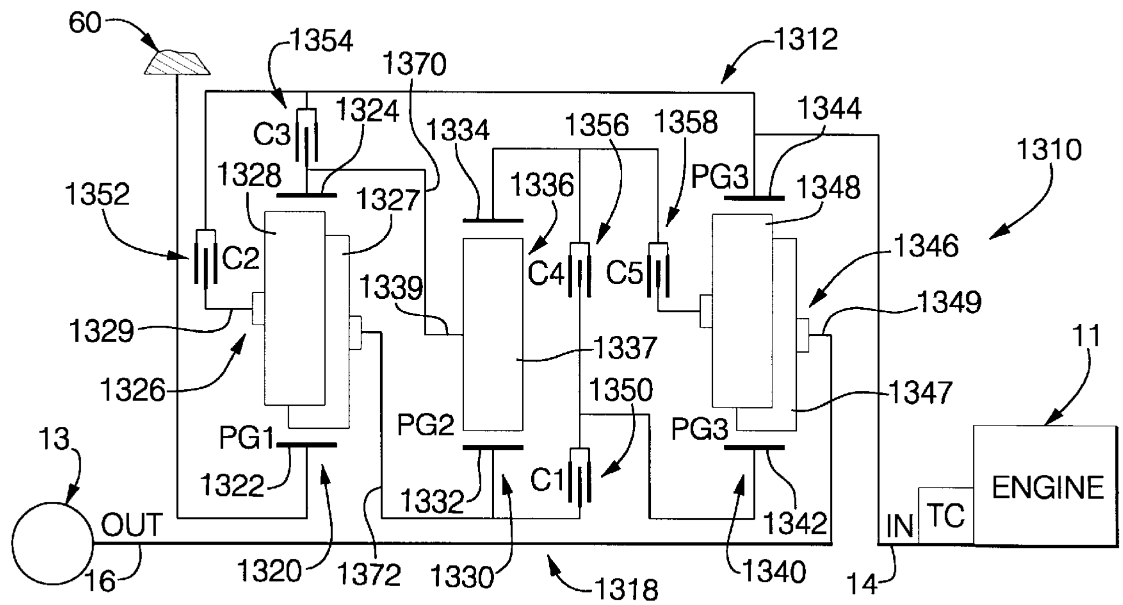
FIG. 27 is schematic representation of a powertrain incorporating another embodiment of the present invention.
FIG. 28 is a truth table and chart describing some of the operating characteristics of the powertrain depicted in FIG. 27.

A powertrain 1310, shown in FIG. 27, includes a conventional engine 11, a multi-speed planetary transmission 1312, and a conventional final drive 13. The multi-speed planetary transmission incorporates an input shaft 14, an output shaft 16 and a planetary gearing arrangement 1318. The planetary gearing arrangement 1318 has a first planetary gear set 1320, a second planetary gear set 1330 and a third planetary gear set 1340. The planetary gearing arrangement 1318 also consists of five torque transmitting mechanisms 1350, 1352, 1354, 1356, and 1358. These torque transmitting mechanisms are conventional rotating-type torque transmitting mechanisms, commonly called clutches, that are selectively engageable fluid-operated devices. The engagement and disengagement of the torque transmitting mechanisms is preferably controlled by a conventional electro-hydraulic control mechanism, not shown, that includes a programmable digital computer and a plurality of conventional sensors such as speed sensors and pressure sensors to name a couple.

The planetary gear set 1320 includes a sun gear member 1322, a ring gear member 1324 and a planet carrier assembly member 1326 that has a plurality of intermeshing pinion gear members 1327 and 1238 rotatably mounted on a carrier member 1329. The pinion gear members 1237 are disposed in meshing relation with the sun gear member 1322 and the pinion gear members 1238 are disposed in meshing relation with the ring gear member 1324. The planetary gear set 1330 has a sun gear member 1332, a ring gear member 1334 and a planet carrier assembly member 1336 that includes a plurality of pinion gear members 1337 rotatably mounted on a carrier member 1339 and disposed in meshing relation with both the sun gear member 1332 and the ring gear member 1334. The planetary gear set 1340 includes a sun gear member 1342, a ring gear member 1344 and a planet carrier assembly member 1346 that has a plurality of intermeshing pinion gear members 1347 and 1348 rotatably mounted on a carrier member 1349. The pinion gear members 1347 are disposed in meshing relation with the sun gear member 1342 and the pinion gear members 1348 are disposed in meshing relation with the ring gear member 1344.

A first continuous interconnection 1370 continuously interconnects the ring gear member 1324 and the planet carrier assembly member 1336. A second continuous interconnection 1372 continuously interconnects the planet carrier assembly member 1326 and the sun gear member 1332. The sun gear member 1322 is continuously connected with the grounding member 60. The input shaft 14 is continuously connected with the ring gear member 1344, selectively connectable with the first continuous interconnection 1370 through the torque transmitting mechanism 1354, and selectively connectable with the second continuous interconnection 1372 through the torque transmitting mechanism 1352. The output shaft 16 is continuously connected with the planet carrier assembly member 1346 and selectively connectable with the ring gear member 1334 through the torque transmitting mechanism 1358. The sun gear member 1342 is selectively connectable with the second continuous interconnection 1372 through the torque transmitting mechanism 1350 and is selectively connectable with the ring gear member 1334 through the torque transmitting mechanism 1356. The planetary gear set 1320 has members continuously interconnected with respective members of the planetary gear set 1330 and the grounding member 60. The planetary gear set 1330 has one member that is non-continuously connected. The planetary gear set 1340 has two members continuously connected with the input shaft 14 and the output shaft 16, respectively, and one member that is non-continuously connected.

The truth table shown in FIG. 28 defines the torque transmitting mechanism engagement required for each of the forward speed ratios and the reverse speed ratio. As shown in FIG. 28, the torque transmitting mechanism 1350, 1352, 1354, 1356, and 1358 are engaged in combinations of two to establish seven forward speed ratios and a reverse speed ratio between the input shaft 14 and the output shaft 16. The numeric values for the ratios have been determined using the ring/sun tooth ratios given in FIG. 28. The R1/S1 value is the ring/sun tooth ratio of the planetary gear set 1320, the R2/S2 value is the ring/sun tooth ratio of the planetary gear set 1330, and the R3/S3 value is the ring/sun tooth ratio of the planetary gear set 1340. As can be determined from the truth table, the single ratio interchanges for the forward speed ratios are single transition interchanges. Also, double step interchanges such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$ are single transition interchanges. FIG. 28 also describes the step ratio between adjacent ratios, for example, the numerical step between $1^{st}$ and $2^{nd}$ is 1.40.

Those skilled in the art will recognize that the numeric value of the reverse speed ratio is determined by the planetary gear sets 1320 and 1340. The numeric value of the first forward speed ratio is determined by the planetary gear sets 1320 and 1330. The numeric value of the second forward speed ratio is determined by the planetary gear sets 1320, 1330, and 1340. The numeric value of the third forward speed ratio is determined by the planetary gear set 1320 and 1330. The fourth forward speed ratio is a one-to-one ratio. The numeric value of the fifth forward speed ratio is determined by the planetary gear sets 1320, 1330, and 1340. The numeric value of the sixth forward speed ratio is determined by the planetary gear sets 1320, 1330, and 1340. The numeric value of the seventh forward speed ratio is determined by the planetary gear set 1340.

What is claimed is:

1. A transmission comprising:

an input shaft;

an output shaft;

a planetary gear arrangement comprising, first, second, and third planetary gear sets, five rotating torque transmitting mechanisms, including first, second, third, fourth, and fifth torque-transmitting mechanisms, and first and second continuous interconnections; each of said planetary gear sets having first second and third members;

said first continuous interconnection interconnecting said first members of said first and second planetary gear sets, said second continuous interconnection interconnecting said second members of said first and second planetary gear sets, said third member of said first planetary gear set being continuously interconnected with a stationary grounding member of the transmission, said third member of said second planetary gear set being non-continuously interconnected;

said first member of said third planetary gear set being continuously connected with said input shaft, said second member of said third planetary gear set being continuously connected with said output shaft, and said third member of said third planetary gear set being non-continuously interconnected; and said five rotating torque-transmitting mechanisms being selectively engageable to establish combinations of members joined for common rotation including either:

said first torque-transmitting mechanism selectively interconnecting said input shaft with said first continuous interconnecting member, said second torque-transmitting mechanism selectively interconnecting said output shaft with said second continuous interconnecting member, said third torque-transmitting mechanism selective interconnecting said second continuous interconnecting member with said third member of said third planetary gear set, said fourth torque-transmitting mechanism selectively interconnecting said input shaft with said third member of said second planetary gear set, and said fifth torque-transmitting mechanism selectively interconnecting said third member of said third planetary gear set with said third member of said second planetary gear set, or said first torque-transmitting mechanism selectively interconnecting said input shaft with said second continuous interconnecting member, said second torque-transmitting mechanism selectively interconnecting said output shaft with said first continuous interconnecting member, said third torque-transmitting mechanism selectively interconnecting said third member of said third planetary gear set with said first continuous interconnecting member, said fourth torque-transmitting mechanism selectively interconnecting said third member of said third planetary gear set with said second continuous interconnecting member, and said fifth torque-transmitting mechanism selectively interconnecting said third member of said second planetary gear set with said output shaft, or said first torque-transmitting mechanism selectively interconnecting said input shaft with said second continuous interconnecting member, said second torque-transmitting mechanism selectively interconnecting said output shaft with said second continuous interconnecting member, said third torque-transmitting mechanism selectively interconnecting said third member of said third planetary gear set with said first continuous interconnecting member, said fourth torque-transmitting mechanism selectively interconnecting said third member of said third planetary gear set with said second continuous interconnecting member, said fifth torque-transmitting mechanism selectively interconnecting said third member of said second planetary gear set with said input shaft, or said first torque-transmitting mechanism selectively interconnecting said input shaft with said first continuous interconnecting member, said second torque-transmitting mechanism selectively interconnecting said output shaft with said first continuous interconnecting member, said third torque-transmitting mechanism selectively interconnecting said third member of said third planetary gear set with said first continuous interconnecting member, said fourth torque-transmitting mechanism selectively interconnecting said input shaft with said second continuous interconnecting member, and said fifth torque-transmitting mechanism selectively interconnecting said third member of said second planetary gear set with said third member of said third planetary gear set, or said first torque-transmitting mechanism selectively interconnecting said input shaft with said second continuous interconnecting member, said second torque-transmitting mechanism selectively interconnecting said output shaft with said first continuous interconnecting member, said third torque-transmitting mechanism selectively interconnecting said third member of said third planetary gear set with said first continuous interconnecting member, said fourth torque-transmitting mechanism selectively interconnecting said third member of said third planetary gear set with said second continuous interconnecting member, said fifth torque-transmitting mechanism selectively interconnecting said third member of said second planetary gear set with said output shaft, or said first torque-transmitting mechanism selectively interconnecting said input shaft with said first continuous interconnecting member, said second torque-transmitting mechanism selectively interconnecting said output shaft with said second continuous interconnecting member, said third torque-transmitting mechanism selectively interconnecting said third member of said third planetary gear set with said first continuous interconnecting member, said fourth torque-transmitting mechanism selectively interconnecting said third member of said third planetary gear set with said third member of said second planetary gear set, said fifth torque-transmitting mechanism selectively interconnecting said third member of said second planetary gear set with said output shaft, or said first torque-transmitting mechanism selectively interconnecting said input shaft with said second continuous interconnecting member, said second torque-transmitting mechanism selectively interconnecting said output shaft with said second continuous interconnecting member, said third torque-transmitting mechanism selectively interconnecting said third member of said third planetary gear set with said first continuous interconnecting member, said fourth torque-transmitting mechanism selectively interconnecting said first continuous interconnecting member with said output shaft, and said fifth torque-transmitting mechanism selectively interconnecting said third member of said second planetary gear set with said third member of said third planetary gear set, or said first torque-transmitting mechanism selectively interconnecting said input shaft with said second continuous interconnecting member, said second torque-transmitting mechanism selectively interconnecting said output shaft with said first continuous interconnecting member, said third torque-transmitting mechanism selectively interconnecting said third member of said third planetary gear set with said second continuous interconnecting member, said fourth torque-transmitting mechanism selectively interconnecting said third member of said second planetary gear set with said input shaft, and said fifth torque-transmitting mechanism selectively interconnecting said third member of said second planetary gear set with said third member of said third planetary gear set, or said first torque-transmitting mechanism selectively interconnecting said input shaft with said second continuous interconnecting member, said second torque-transmitting mechanism selectively interconnecting said output shaft with said second continuous interconnecting member, said third torque-transmitting mechanism selectively interconnecting said third member of said third planetary gear set with said second continuous interconnecting member, said fourth torque-transmitting mechanism selectively interconnecting said first continuous interconnecting member with said output shaft, and said fifth torque-transmitting mechanism selectively interconnecting said third member of said second planetary gear set with said third member of said third planetary gear set, or said first torque-transmitting mechanism selectively interconnecting said input shaft with said first continuous interconnecting member, said second torque-transmitting mechanism selectively interconnecting said output shaft with said second continuous interconnecting member, said third torque-transmitting mechanism selectively interconnecting said third member of said third planetary gear set with said second continuous interconnecting member, said fourth torque-transmitting mechanism selectively interconnecting said third member of said third planetary gear set with said first continuous interconnecting member, and said fifth torque-transmitting mechanism selectively interconnecting said third member of said second planetary gear set with said third member of said third planetary gear set, or said first torque-transmitting mechanism selectively interconnecting said input shaft with said third member of said second planetary gear set, said second torque-transmitting mechanism selectively interconnecting said output shaft with said first continuous interconnecting member, said third torque-transmitting mechanism selectively interconnecting said third member of said third planetary gear set with said second continuous interconnecting member, said fourth torque-transmitting mechanism selectively interconnecting said third member of said second planetary gear set with said output shaft, and said fifth torque-transmitting mechanism selectively interconnecting said third member of said second planetary gear set with said first continuous interconnecting member, or said first torque-transmitting mechanism selectively interconnecting said input shaft with said second continuous interconnecting member, said second torque-transmitting mechanism selectively interconnecting said output shaft with said second continuous interconnecting member, said third torque-transmitting mechanism selectively interconnecting said third member of said third planetary gear set with said first continuous interconnecting member, said fourth torque-transmitting mechanism selectively interconnecting said third member of said second planetary gear set with said output shaft, said fifth torque-transmitting mechanism selectively interconnecting said third member of said second planetary gear set with said third member of said third planetary gear set, or said first torque-transmitting mechanism selectively interconnecting said input shaft with said first continuous interconnecting member, said second torque-transmitting mechanism selectively interconnecting said output shaft with said second continuous interconnecting member, said third torque-transmitting mechanism selectively interconnecting said third member of said third planetary gear set with said second continuous interconnecting member, said fourth torque-transmitting mechanism selectively interconnecting said third member of said third planetary gear set with said first continuous interconnecting member, and said fifth torque-transmitting mechanism selectively interconnecting said third member of said second planetary gear set with said input shaft, or said first torque-transmitting mechanism selectively interconnecting said input shaft with said first continuous interconnecting member, said second torque-transmitting mechanism selectively interconnecting said output shaft with said third member of said second planetary gear set, said third torque-transmitting mechanism selectively interconnecting said third member of said third planetary gear set with said second continuous interconnecting member, said fourth torque-transmitting mechanism selectively interconnecting said second continuous interconnecting member with said input shaft, and said fifth torque-transmitting mechanism selectively interconnecting said third member of said second planetary gear set with said third member of said third planetary gear set.

2. The transmission defined in claim 1 further wherein;

said first, second, and third members of said planetary gear sets are defined as one of a sun gear member, a ring gear member, and a planet carrier assembly member.

3. The transmission defined in claim 2 further wherein: said planet carrier assembly member comprises a planet carrier rotatably supporting a plurality of pinion gears disposed in meshing relation with both said sun gear member and said ring gear member.

4. The family of transmissions defined in claim 2 further wherein:

at least one of said planet carrier assembly member comprises a planet carrier rotatably supporting a plurality of intermeshing first and second pinion gears, said first pinion gears being disposed in meshing relation with said sun gear member and said second pinion gears being disposed in meshing relation with said ring gear member.

5. A multi-speed transmission comprising:

an input shaft;

an output shaft;

a first continuous interconnecting member;

a second continuous interconnecting member;

three planetary gear sets each including three members;

a first member of said first planetary gear set and a first member of said second planetary gear set being continuously connected with said first continuous interconnecting member, a second member of said first planetary gear set and a second member of said second planetary gear set being continuously interconnected with said second continuous interconnecting member, a third member of said first planetary gear set being continuously connected with a transmission housing member, said input shaft being continuously connected with one member of said third planetary gear set, and said output shaft being continuously connected with another member of said third planetary gear set; and five selectively connectable torque-transmitting mechanisms engageable in combinations of two to establish six forward speed ratios and one reverse ratio between said input shaft and said output shaft.

6. The family of transmissions defined in claim 5 further wherein:

said torque transmitting mechanisms in at least three of said family members are selectively operable in combinations of two to establish seven forward speed ratios and one reverse ratio between said input shaft and said output shaft.

7. The transmission defined in claim 5 further wherein:

at least one of said planetary gear sets is of the simple planet pinion type in each family member.

8. A transmission comprising:

an input shaft;

an output shaft;

first, second, and third planetary gear sets each having first, second, and third members, said first member of said third planetary gear set being continuously connected with said input shaft, said second member of said third planetary gear set being continuously connected with said output shaft, said first member of said first planetary gear set being continuously connected with a stationary portion of a transmission housing, said second member of said first planetary gear set being continuously connected with said first member of said second planetary gear set through a first interconnecting member, and said third member of said first planetary gear set being continuously connected with said second member of said second planetary gear set through a second interconnecting member;

a first rotating torque transmitting mechanism selectively engageable for interconnecting said input shaft with said first interconnecting member, a second rotating torque transmitting mechanism selectively engageable for interconnecting said output shaft with said second interconnecting member when engaged, a third rotating torque transmitting mechanism selectively engageable for interconnecting said third member of said third planetary gear set with said second interconnecting member when engaged, a fourth rotating torque transmitting mechanism selectively engageable for interconnecting said first member of said third planetary gear set with said third member of said second planetary gear set when engaged, and a fifth rotating torque transmitting mechanism selectively engageable for interconnecting said third member of said second planetary gear set with said third member of said third planetary gear set when engaged; and said five rotating type torque transmitting mechanisms being selectively engaged in combinations of two to establish at least six forward speed ratios between said input shaft and said output shaft.

* * * * *